(12) United States Patent
Aleem et al.

(10) Patent No.: US 9,483,123 B2
(45) Date of Patent: Nov. 1, 2016

(54) SYSTEMS, ARTICLES, AND METHODS FOR GESTURE IDENTIFICATION IN WEARABLE ELECTROMYOGRAPHY DEVICES

(71) Applicant: Thalmic Labs Inc., Kitchener (CA)

(72) Inventors: Idris S. Aleem, Pickering (CA); Pedram Ataee, Waterloo (CA); Matthew Bailey, Kitchener (CA)

(73) Assignee: THALMIC LABS INC., Kitchener (CA)

( * ) Notice: Subject to any disclaimer, the term of this patent is extended or adjusted under 35 U.S.C. 154(b) by 25 days.

(21) Appl. No.: 14/494,274

(22) Filed: Sep. 23, 2014

(65) Prior Publication Data

US 2015/0084860 A1 Mar. 26, 2015

Related U.S. Application Data

(60) Provisional application No. 61/881,064, filed on Sep. 23, 2013.

(51) Int. Cl.
*G06F 3/01* (2006.01)

(52) U.S. Cl.
CPC ............... *G06F 3/017* (2013.01); *G06F 3/014* (2013.01); *G06F 3/015* (2013.01)

(58) Field of Classification Search
CPC .... G06F 3/015; G06F 3/017; G06F 3/04883; G06F 3/0346
USPC ........................................................ 600/546
See application file for complete search history.

(56) References Cited

U.S. PATENT DOCUMENTS 3,620,208 A 11/1971 Higley et al.
3,880,146 A 4/1975 Everett et al.
(Continued)

FOREIGN PATENT DOCUMENTS

EP 0 301 790 A2 2/1989
JP 2009-50679 A 3/2009
(Continued)

OTHER PUBLICATIONS

Costanza et al., "EMG as a Subtle Input Interface for Mobile Computing," Mobile HCI 2004, LNCS 3160, edited by S. Brewster and M. Dunlop, Springer-Verlag Berlin Heidelberg, pp. 4264-430, 2004.
(Continued)

*Primary Examiner* — Kenneth Bukowski
(74) *Attorney, Agent, or Firm* — Seed IP Law Group LLP

(57) ABSTRACT

Systems, articles, and methods for performing gesture identification with improved robustness against variations in use parameters and without requiring a user to undergo an extensive training procedure are described. A wearable electromyography ("EMG") device includes multiple EMG sensors, an on-board processor, and a non-transitory processor-readable storage medium that stores data and/or processor-executable instructions for performing gesture identification. The wearable EMG device detects, determines, and ranks features in the signal data provided by the EMG sensors and generates a digit string based on the ranked features. The permutation of the digit string is indicative of the gesture performed by the user, which is identified by testing the permutation of the digit string against multiple sets of defined permutation conditions. A single reference gesture may be performed by the user to (re-)calibrate the wearable EMG device before and/or during use.

28 Claims, 4 Drawing Sheets

(56) References Cited

U.S. PATENT DOCUMENTS

| | | | |
|---|---|---|---|
| 4,602,639 | A | 7/1986 | Hoogendoorn et al. |
| 5,003,978 | A | 4/1991 | Dunseath, Jr. |
| 5,482,051 | A | 1/1996 | Reddy et al. |
| 5,683,404 | A | 11/1997 | Johnson |
| 6,032,530 | A | 3/2000 | Hock |
| 6,238,338 | B1 | 5/2001 | DeLuca et al. |
| 6,244,873 | B1 | 6/2001 | Hill et al. |
| 6,487,906 | B1 | 12/2002 | Hock |
| 6,510,333 | B1 | 1/2003 | Licata et al. |
| 6,720,984 | B1* | 4/2004 | Jorgensen .............. G06F 3/015 600/300 |
| 6,807,438 | B1 | 10/2004 | Brun Del Re et al. |
| 6,865,409 | B2 | 3/2005 | Getsla et al. |
| 6,965,842 | B2* | 11/2005 | Rekimoto .............. G06F 3/011 702/150 |
| 7,173,437 | B2 | 2/2007 | Hervieux et al. |
| 7,333,090 | B2 | 2/2008 | Tanaka et al. |
| 7,596,393 | B2 | 9/2009 | Jung et al. |
| 7,809,435 | B1 | 10/2010 | Ettare et al. |
| 8,054,061 | B2 | 11/2011 | Prance et al. |
| 8,170,656 | B2 | 5/2012 | Tan et al. |
| 8,421,634 | B2 | 4/2013 | Tan et al. |
| 8,447,704 | B2 | 5/2013 | Tan et al. |
| 8,922,481 | B1 | 12/2014 | Kauffmann et al. |
| 2002/0032386 | A1 | 3/2002 | Sackner et al. |
| 2002/0077534 | A1 | 6/2002 | DuRousseau |
| 2003/0036691 | A1 | 2/2003 | Stanaland et al. |
| 2004/0068409 | A1* | 4/2004 | Tanaka .................. B25J 9/1656 704/272 |
| 2004/0073104 | A1 | 4/2004 | Brun del Re et al. |
| 2004/0210165 | A1 | 10/2004 | Marmaropoulos et al. |
| 2005/0119701 | A1 | 6/2005 | Lauter et al. |
| 2005/0177038 | A1 | 8/2005 | Kolpin et al. |
| 2006/0061544 | A1 | 3/2006 | Min et al. |
| 2008/0136775 | A1 | 6/2008 | Conant |
| 2009/0051544 | A1 | 2/2009 | Niknejad |
| 2009/0251407 | A1 | 10/2009 | Flake et al. |
| 2009/0318785 | A1 | 12/2009 | Ishikawa et al. |
| 2009/0326406 | A1* | 12/2009 | Tan ........................ G06F 1/163 600/546 |
| 2009/0327171 | A1* | 12/2009 | Tan ........................ G06F 3/015 706/12 |
| 2010/0041974 | A1 | 2/2010 | Ting et al. |
| 2010/0280628 | A1 | 11/2010 | Sankai |
| 2010/0293115 | A1 | 11/2010 | Seyed Momen |
| 2010/0317958 | A1 | 12/2010 | Beck et al. |
| 2011/0134026 | A1 | 6/2011 | Kang et al. |
| 2011/0166434 | A1 | 7/2011 | Gargiulo |
| 2011/0172503 | A1 | 7/2011 | Knepper et al. |
| 2012/0029322 | A1 | 2/2012 | Wartena et al. |
| 2012/0101357 | A1 | 4/2012 | Hoskuldsson et al. |
| 2012/0157789 | A1 | 6/2012 | Kangas et al. |
| 2012/0165695 | A1 | 6/2012 | Kidmose et al. |
| 2012/0188158 | A1 | 7/2012 | Tan et al. |
| 2012/0209134 | A1* | 8/2012 | Morita .............. A61B 5/04012 600/546 |
| 2012/0265090 | A1 | 10/2012 | Fink et al. |
| 2012/0302858 | A1 | 11/2012 | Kidmose et al. |
| 2013/0005303 | A1 | 1/2013 | Song et al. |
| 2013/0027341 | A1 | 1/2013 | Mastandrea |
| 2013/0127708 | A1 | 5/2013 | Jung et al. |
| 2013/0165813 | A1 | 6/2013 | Chang et al. |
| 2013/0191741 | A1 | 7/2013 | Dickinson et al. |
| 2013/0198694 | A1* | 8/2013 | Rahman ................ G06F 3/0484 715/864 |
| 2013/0317648 | A1* | 11/2013 | Assad .................... B25J 9/1694 700/258 |
| 2014/0028546 | A1 | 1/2014 | Jeon et al. |
| 2014/0049417 | A1 | 2/2014 | Abdurrahman et al. |
| 2014/0349257 | A1 | 11/2014 | Connor |
| 2014/0354528 | A1 | 12/2014 | Laughlin et al. |
| 2014/0354529 | A1 | 12/2014 | Laughlin et al. |

FOREIGN PATENT DOCUMENTS

| | | |
|---|---|---|
| KR | 20120094870 A | 8/2012 |
| KR | 20120097997 A | 9/2012 |
| WO | 2011/070554 A2 | 6/2011 |

OTHER PUBLICATIONS

Costanza et al., "Toward Subtle Intimate Interfaces for Mobile Devices Using an EMG Controller," CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities," IEEE Transactions on Information Technology in Biomedicine, vol. 14, No. 2, pp. 198-206, Mar. 2010.

Gourmelon et al., "Contactless sensors for Surface Electromyography," Proceedings of the 28th IEEE EMBS Annual International Conference, New York City, NY, Aug. 30-Sep. 3, 2006, pp. 2514-2517.

International Search Report and Written Opinion, mailed May 16, 2014, for corresponding International Application No. PCT/US2014/017799, 9 pages.

International Search Report and Written Opinion, mailed Aug. 21, 2014, for corresponding International Application No. PCT/US2014/037863, 10 pages.

International Search Report and Written Opinion, mailed Nov. 21, 2014, for corresponding International Application No. PCT/US2014/052143, 9 pages.

International Search Report and Written Opinion, mailed Feb. 27, 2015, for corresponding International Application No. PCT/US2014/067443, 10 pages.

International Search Report and Written Opinion, mailed May 27, 2015, for corresponding International Application No. PCT/US2015/015675, 9 pages.

Morris et al., "Emerging Input Technologies for Always-Available Mobile Interaction," *Foundations and Trends in Human-Computer Interaction* 4(4):245-316, 2010. (74 total pages).

Naik et al., "Real-Time Hand Gesture Identification for Human Computer Interaction Based on ICA of Surface Electromyogram," IADIS International Conference Interfaces and Human Computer Interaction 2007, 8 pages.

Picard et al., "Affective Wearables," Proceedings of the IEEE $1^{st}$ International Symposium on Wearable Computers, ISWC, Cambridge, MA, USA, Oct. 13-14, 1997, pp. 90-97.

Rekimoto, "GestureWrist and GesturePad: Unobtrusive Wearable Interaction Devices," ISWC '01 Proceedings of the $5^{th}$ IEEE International Symposium on Wearable Computers, 2001, 7 pages.

Saponas et al., "Making Muscle-Computer Interfaces More Practical," CHI 2010, Atlanta, Georgia, USA, Apr. 10-15, 2010, 4 pages.

Sato et al., "Touche. Enhancing Touch Interaction on Humans, Screens, Liquids, and Everyday Objects," CHI' 12, May 5-10, 2012, Austin, Texas.

Ueno et al., "A Capacitive Sensor System for Measuring Laplacian Electromyogram through Cloth: A Pilot Study," Proceedings of the $29^{th}$ Annual International Conference of the IEEE EMBS, Cite Internationale, Lyon, France, Aug. 23-26, 2007.

Ueno et al., "Feasibility of Capacitive Sensing of Surface Electromyographic Potential through Cloth," *Sensors and Materials* 24(6):335-346, 2012.

Xiong et al., "A Novel HCI based on EMG and IMU," Proceedings of the 2011 IEEE International Conference on Robotics and Biomimetics, Phuket, Thailand, Dec. 7-11, 2011, 5 pages.

Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.

\* cited by examiner

| Permutations of the digit string that satisfy the set of permutation conditions | Gesture Identification |
|---|---|
| 25348167<br>25346817<br>25346718<br>25436718<br>53428167<br>... | <br>"Point" or "Gun" gesture |
| 81756234<br>81765324<br>87165324<br>87165423<br>81756423<br>... | <br>"Thumbs Up" gesture |
| ... | ... | ns
SYSTEMS, ARTICLES, AND METHODS FOR GESTURE IDENTIFICATION IN WEARABLE ELECTROMYOGRAPHY DEVICES

BACKGROUND

Technical Field

The present systems, articles, and methods generally relate to wearable electromyography devices that perform gesture identification with improved robustness against variations in use parameters.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Human-Electronics Interfaces

A wearable electronic device may provide direct functionality for a user (such as audio playback, data display, computing functions, etc.) or it may provide electronics to interact with, receive information from, or control another electronic device. For example, a wearable electronic device may include sensors that detect inputs effected by a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, articles, and methods may be applied to HCIs, but may also be applied to any other form of human-electronics interface.

Electromyography Devices

Electromyography ("EMG") is a process for detecting and processing the electrical signals generated by muscle activity. EMG devices employ EMG sensors that are responsive to the range of electrical potentials (typically µV–mV) involved in muscle activity. EMG signals may be used in a wide variety of applications, including: medical monitoring and diagnosis, muscle rehabilitation, exercise and training, prosthetic control, and even in controlling functions of electronic devices.

Human-electronics interfaces that employ EMG have been proposed. For example, U.S. Pat. Nos. 6,244,873 and 8,170,656 describe such systems. Characteristics that are common to these known proposals will now be described.

Typically, for such systems, a user dons a wearable EMG device and the device detects muscle activity corresponding to a physical gesture performed by the user. The wearable EMG device processes EMG signals corresponding to the detected muscle activity to identify the gesture that the user has performed. However, known proposals for wearable EMG devices are not immediately able to accurately and reliably identify gestures performed by any generic user or even by the same user under different use conditions (e.g., once the wearable EMG device has been removed and put back on in a different position and/or with a different orientation). On the contrary, known proposals for wearable EMG devices (including the two examples listed above) require any given user to undergo an elaborate training procedure in order to calibrate the wearable EMG device each time the user puts on the wearable EMG device. A typical training procedure is carried out before the wearable EMG device is operable to identify gestures performed by the user (i.e., pre-runtime) and requires the user to perform a series of training trials for multiple training gestures (i.e., multiple training trials for each one of multiple training gestures). The wearable EMG device calibrates use parameters based on the EMG signals detected during the training gestures. The quality of the calibration typically increases with the number of training trials performed for each training gesture, so the training procedure may involve many training trials. Once a user has completed the training procedure, the wearable EMG device may perform reasonably well (i.e., during runtime) at identifying gestures of the specific user and under the specific use conditions for which it has been calibrated, but the wearable EMG device may perform very poorly at identifying gestures of other users and/or at identifying gestures of the same user after the wearable EMG device has been removed and put back on in a different position, with a different rotation, and/or with a different orientation. If a different user wishes to use the wearable EMG device, then that different user must go through the training procedure in order to recalibrate the wearable EMG device to work for them. Furthermore, if the same user removes the wearable EMG device (because, for example, the user has finished using it for a period of time), then that same user typically needs to undergo the training procedure again when the wearable EMG device is re-applied, since any subsequent use of the wearable EMG device may involve slightly different use conditions (such as, for example, different device position, rotation, and/or orientation, and/or different skin conditions such as temperature, moisture, hair density, and so on) which may give rise to different use parameters. The requirement for each user to undergo an elaborate training procedure for each use and the inability to readily identify gestures of any generic user are limitations of known proposals for wearable EMG devices that degrade the overall user experience. There is a need in the art for wearable EMG devices that perform gesture identification with improved robustness against variations in use parameters.

BRIEF SUMMARY

A method of operating a wearable electromyography ("EMG") device, wherein the wearable EMG device includes a set of EMG sensors and a processor, the set of EMG sensors communicatively coupled to the processor, wherein the method may be summarized as including: detecting muscle activity of a user of the wearable EMG device by the set of EMG sensors, wherein the muscle activity corresponds to a gesture performed by the user; in response to detecting muscle activity of the user by the set of EMG sensors, providing a set of signals from the set of EMG sensors to the processor; determining a set of values from the set of signals by the processor; ranking each value in the set of values by the processor, wherein ranking each value in the set of values by the processor includes assigning a rank number to each value in the set of values by the processor; generating a permutation of a digit string based at least in part on the rank number of each value in the set of values by the processor; and identifying the gesture by the processor based at least in part on the permutation of the digit string.

Determining a set of values from the set of signals by the processor may include determining a set of features from the set of signals by the processor, wherein each feature in the set of features is selected from the group consisting of: an average value of each signal in the set of signals, a mean value of each signal in the set of signals, a median value of each signal in the set of signals, a mode value of each signal in the set of signals, a maximum value of each signal in the set of signals, a minimum value of each signal in the set of signals, a standard deviation of each signal in the set of signals, and/or a root mean squared ("RMS") value of each signal in the set of signals. Determining a set of values from the set of signals by the processor may further include determining a respective difference between each feature in the set of features and each of the other features in the set of features by the processor, and ranking each value in the set of values by the processor may include ranking each respective difference between each feature in the set of features and each of the other features in the set of features by the processor. Determining a set of values from the set of signals by the processor may include determining a respective correlation between each feature in the set of features and each of the other features in the set of features by the processor, and ranking each value in the set of values by the processor may include ranking each respective correlation between each feature in the set of features and each of the other features in the set of features by the processor.

The method may further include determining an orientation of the wearable EMG device on the user by the wearable EMG device. The wearable EMG device may include at least one inertial sensor communicatively coupled to the processor, and determining an orientation of the wearable EMG device on the user by the wearable EMG device may include: in response to performance of a reference gesture by the user, detecting muscle activity of the user of the wearable EMG device by the set of EMG sensors, wherein the muscle activity corresponds to the reference gesture performed by the user; in response to detecting muscle activity of the user by the set of EMG sensors, providing a set of reference EMG signals from the set of EMG sensors to the processor; in response to performance of the reference gesture by the user, detecting motion of the wearable EMG device by the at least one inertial sensor, wherein the motion corresponds to the reference gesture performed by the user; in response to detecting motion of the wearable EMG device by the at least one inertial sensor, providing at least one motion signal from the at least one inertial sensor to the processor; and determining an orientation of the wearable EMG device based on the set of reference EMG signals and the at least one motion signal by the processor. The wearable EMG device may include a non-transitory processor-readable storage medium that stores at least one permutation condition, and the method may further include: calibrating the at least one permutation condition based at least in part on the orientation of the wearable EMG device. The method may include prompting the user to perform at least one defined reference gesture.

The wearable EMG device may include at least one inertial sensor communicatively coupled to the processor, and the method may further include: detecting motion of the wearable EMG device by the at least one inertial sensor, wherein the motion corresponds to the gesture performed by the user; in response to detecting motion of the wearable EMG device, providing at least one signal from the at least one inertial sensor to the processor; and processing the at least one signal from the at least one inertial sensor by the processor. Identifying the gesture by the processor based at least in part on the permutation of the digit string may include identifying the gesture by the processor based at least in part on a result of the processing the at least one signal from the at least one inertial sensor by the processor.

The wearable EMG device may include a non-transitory processor-readable storage medium communicatively coupled to the processor, wherein the non-transitory processor-readable storage medium stores processor-executable gesture identification instructions. Identifying the gesture by the processor based at least in part on the permutation of the digit string may include executing the gesture identification instructions by the processor to cause the processor to identify the gesture based at least in part on the permutation of the digit string. The non-transitory processor-readable storage medium may store multiple sets of permutation conditions and a set of gesture identifications, each gesture identification being associated with a respective set of permutation conditions, and identifying the gesture by the processor based at least in part on the permutation of the digit string may include applying a set of permutation conditions to the permutation of the digit string and returning the corresponding gesture identification if the permutation of the digit string satisfies the set of permutation conditions by the processor. Applying a set of permutation conditions to the permutation of the digit string and returning the corresponding gesture identification if the permutation of the digit string satisfies the set of permutation conditions by the processor may include effecting a many-to-one mapping between the multiple sets of permutation conditions and the set of gesture identifications by the processor. The non-transitory processor-readable storage medium may store a many-to-one look-up table that maps respective sets of multiple permutations of the digit string to respective gesture identifications. Identifying the gesture by the processor based at least in part on the permutation of the digit string may include locating the permutation of the digit string in the many-to-one look-up table and returning the corresponding gesture identification by the processor.

Providing a set of signals from the set of EMG sensors to the processor may include providing a respective signal from each respective EMG sensor in the set of EMG sensors. Ranking each value in the set of values by the processor may include ranking the set of values based at least in part on a respective magnitude of each respective value in the set of values by the processor. Ranking the set of values based at least in part on a respective magnitude of each respective value in the set of values by the processor may include assigning a respective rank number between 1 and N to each respective value in the set of values, wherein N is the number of values in the set of values and the respective rank number that is assigned to each respective value in the set of values is indicative of the magnitude of that value relative to the magnitudes of the other values in the set of values. Ranking the set of values based at least in part on a respective magnitude of each respective value in the set of values by the processor may include: comparing each respective value in the set of values to at least one threshold value by the processor; and assigning a first rank number to each respective value in the set of values that exceeds the at least one threshold value by the processor and assigning a second rank number to each respective value in the set of values that does not exceed the at least one threshold value by the processor.

Determining a set of values from the set of signals by the processor may include grouping the set of signals into a set of time-separated data windows; and determining a respective value corresponding to each respective data window in the set of time-separated data windows.

A wearable electromyography ("EMG") device may be summarized as including: a set of EMG sensors responsive to muscle activity of a user of the wearable EMG device, wherein in response to muscle activity of the user the set of EMG sensors provide a set of signals; a processor communicatively coupled to the set of EMG sensors; a non-transitory processor-readable storage medium communicatively coupled to the processor, wherein the non-transitory processor-readable storage medium stores processor-executable gesture identification instructions that, when executed by the processor, cause the processor to: determine a set of values from the set of signals; assign a rank number to each value in the set of values; generate a permutation of a digit string based at least in part on the rank number of each value in the set of values; and identify a gesture that corresponds to the muscle activity based at least in part on the permutation of the digit string. The wearable EMG device may further include at least one communication terminal communicatively coupled to the processor, the at least one communication terminal to transmit information about the gesture to a receiving device. The at least one communication terminal may include at least one of a wireless communication terminal and/or a tethered connector port.

The wearable EMG device may further include: at least one inertial sensor communicatively coupled to the processor, the at least one inertial sensor responsive to motion effected by the user of the wearable EMG device, wherein in response to motion effected by the user the at least one inertial sensor provides at least one signal to the processor, and wherein the processor-executable gesture identification instructions that, when executed by the processor, cause the processor to identify a gesture that corresponds to the muscle activity based at least in part on the permutation of the digit string include processor-executable gesture identification instructions that, when executed by the processor, cause the processor to identify a gesture that corresponds to both the muscle activity and the motion effected by the user based at least in part on both the permutation of the digit string and a result of processing the at least one signal provided by the at least one inertial sensor by the processor. The at least one inertial sensor may include at least one accelerometer and/or at least one gyroscope.

The processor may be selected from the group consisting of: a digital microprocessor, a digital microcontroller, a digital signal processor, a graphics processing unit, an application specific integrated circuit, a programmable gate array, and a programmable logic unit.

The wearable EMG device may further include a set of communicative pathways to route signals provided by the set of EMG sensors to the processor, wherein each EMG sensor in the set of EMG sensors is communicatively coupled to the processor by at least one communicative pathway from the set of communicative pathways. The wearable EMG device may further include a set of pod structures that form physically coupled links of the wearable EMG device, wherein each pod structure in the set of pod structures is positioned adjacent and physically coupled to at least one other pod structure in the set of pod structures, and wherein the set of pod structures comprises at least two sensor pods and a processor pod, each of the at least two sensor pods comprising a respective EMG sensor from the set of EMG sensors and the processor pod comprising the processor. Each pod structure in the set of pod structures may be positioned adjacent and in between two other pod structures in the set of pod structures and physically coupled to the two other pod structures in the set of pod structures, and the set of pod structures may form a perimeter of an annular configuration. The wearable EMG device may include at least one adaptive coupler, wherein each respective pod structure in the set of pod structures is adaptively physically coupled to at least one adjacent pod structure in the set of pod structures by at least one adaptive coupler.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, articles, and methods for gesture identification in wearable EMG devices with improved robustness against variations in use parameters. The wearable EMG devices described herein provide improved reliability and accuracy of gesture identification for most generic users and/or most generic use conditions for the same user without requiring the user to undergo an elaborate training procedure.

Throughout this specification and the appended claims, the term "gesture" is used to generally refer to a physical action (e.g., a movement, a stretch, a flex, a pose, etc.) performed or otherwise effected by a user. Any physical action performed or otherwise effected by a user that involves detectable muscle activity (detectable, e.g., by at least one appropriately positioned EMG sensor that is responsive to muscle activity) and/or detectable motion (detectable, e.g., by at least one appropriately positioned inertial sensor that is responsive to motion effected by the user, such as an accelerometer and/or a gyroscope) may constitute a gesture in the present systems, articles, and methods.

Figure 1:
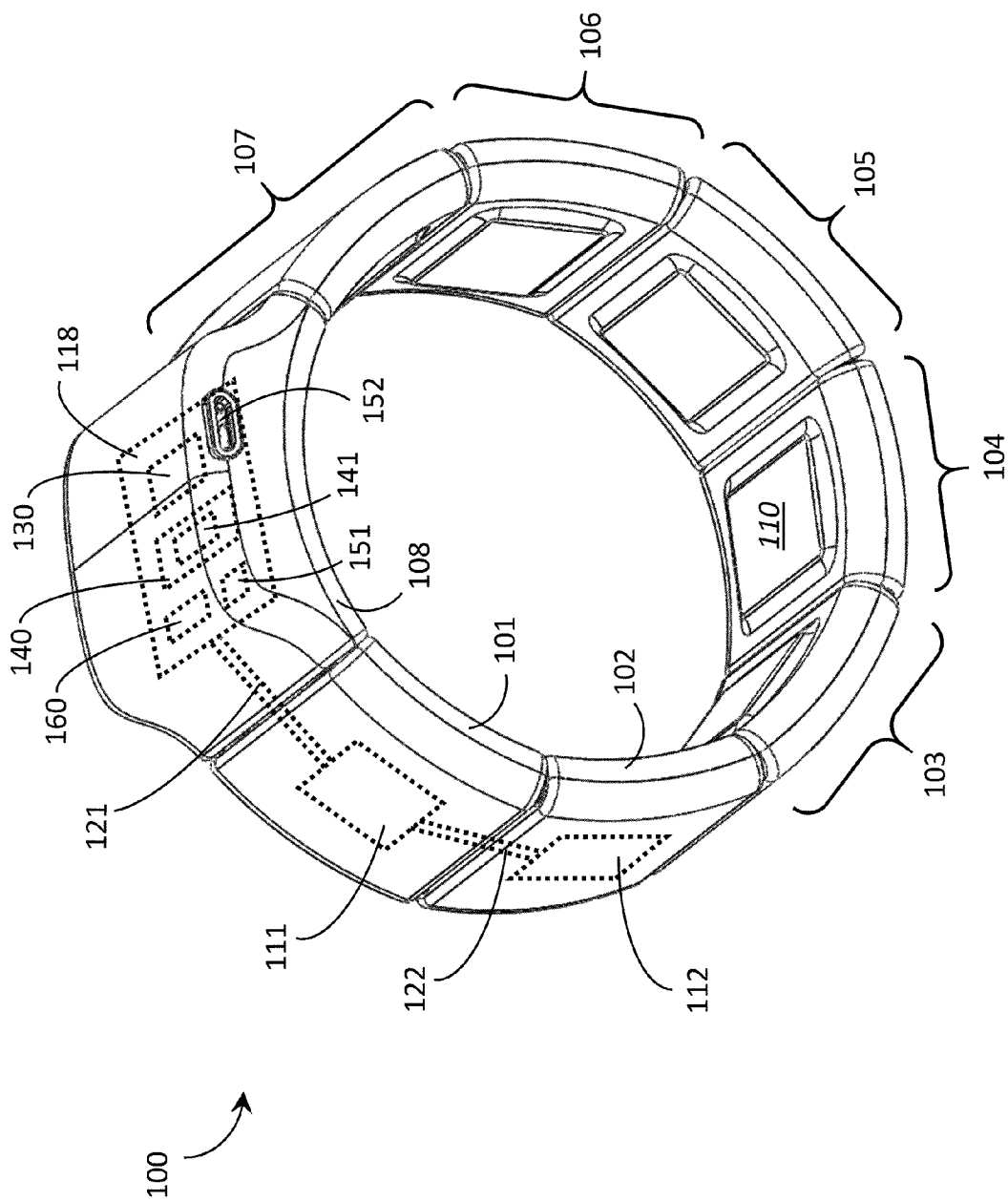
FIG. 1 is a perspective view of an exemplary wearable EMG device that performs gesture identification with improved robustness against variations in use conditions in accordance with the present systems, articles, and methods.

FIG. 1 is a perspective view of an exemplary wearable EMG device 100 that performs gesture identification with improved robustness against variations in use conditions in accordance with the present systems, articles, and methods. Exemplary wearable EMG device 100 may, for example, form part of a human-electronics interface. Exemplary wearable EMG device 100 is an armband designed to be worn on the wrist, forearm, or upper arm of a user, though a person of skill in the art will appreciate that the teachings described herein may readily be applied in wearable EMG devices designed to be worn elsewhere on the body of the user (such as on the leg, finger, ankle, neck, or torso). Some details of exemplary wearable EMG device 100 are described in at least U.S. Provisional Patent Application Ser. No. 61/752,226 (now U.S. Non-Provisional patent application Ser. No. 14/155,107), U.S. Provisional Patent Application Ser. No. 61/768,322 (now U.S. Non-Provisional patent application Ser. No. 14/186,889), U.S. Provisional Patent Application Ser. No. 61/771,500 (now U.S. Non-Provisional patent application Ser. No. 14/194,252), and U.S. Provisional Patent Application Ser. No. 61/869,526 (now U.S. Non-Provisional patent application Ser. No. 14/465,194), each of which is incorporated herein by reference in its entirety.

Device 100 includes a set of eight pod structures 101, 102, 103, 104, 105, 106, 107, and 108 that form physically coupled links of the wearable EMG device 100. Each pod structure in the set of eight pod structures 101, 102, 103, 104, 105, 106, 107, and 108 is positioned adjacent and in between two other pod structures in the set of eight pod structures and the set of pod structures forms a perimeter of an annular or closed loop configuration. For example, pod structure 101 is positioned adjacent and in between pod structures 102 and 108 at least approximately on a perimeter of the annular or closed loop configuration of pod structures, pod structure 102 is positioned adjacent and in between pod structures 101 and 103 at least approximately on the perimeter of the annular or closed loop configuration, pod structure 103 is positioned adjacent and in between pod structures 102 and 104 at least approximately on the perimeter of the annular or closed loop configuration, and so on. Each of pod structures 101, 102, 103, 104, 105, 106, 107, and 108 is physically coupled to the two adjacent pod structures by at least one adaptive coupler (not visible in FIG. 1). For example, pod structure 101 is physically coupled to pod structure 108 by an adaptive coupler and to pod structure 102 by an adaptive coupler. The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band. Thus, each of pod structures 101, 102, 103, 104, 105, 106, 107, and 108 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 100 is depicted in FIG. 1 with the at least one adaptive coupler completely retracted and contained within the eight pod structures 101, 102, 103, 104, 105, 106, 107, and 108 (and therefore the at least one adaptive coupler is not visible in FIG. 1). Further details of adaptive coupling in wearable electronic devices are described in, for example, U.S. Provisional Application Ser. No. 61/860,063 (now U.S. Non-Provisional patent application Ser. No. 14/276,575), which is incorporated herein by reference in its entirety.

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure, component, etc. of the wearable EMG device. For example, pod structures 101 and 102 of device 100 can each be moved or displaced relative to one another within the constraints imposed by the adaptive coupler providing adaptive physical coupling therebetween. The desire for pod structures 101 and 102 to be movable/displaceable relative to one another specifically arises because device 100 is a wearable EMG device that advantageously accommodates the movements of a user and/or different user forms.

Device 100 includes eight pod structures 101, 102, 103, 104, 105, 106, 107, and 108 that form physically coupled links thereof. Wearable EMG devices employing pod structures (e.g., device 100) are used herein as exemplary wearable EMG device designs, while the present systems, articles, and methods may be applied to or with wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 100 of FIG. 1, each of pod structures 101, 102, 103, 104, 105, 106, 107, and 108 comprises a respective housing having a respective inner volume. Each housing may be formed of substantially rigid material and may be optically opaque. Throughout this specification and the appended claims, the term "rigid" as in, for example, "substantially rigid material," is used to describe a material that has an inherent tendency to maintain its shape and resist malformation/deformation under the moderate stresses and strains typically encountered by a wearable electronic device.

Details of the components contained within the housings (i.e., within the inner volumes of the housings) of pod structures 101, 102, 103, 104, 105, 106, 107, and 108 are not visible in FIG. 1. To facilitate descriptions of exemplary device 100, some internal components are depicted by dashed lines in FIG. 1 to indicate that these components are contained in the inner volume(s) of housings and may not normally be actually visible in the view depicted in FIG. 1, unless a transparent or translucent material is employed to form the housings. For example, any or all of pod structures 101, 102, 103, 104, 105, 106, 107, and/or 108 may include electric circuitry (e.g., electrical and/or electronic circuitry). In FIG. 1, a first pod structure 101 is shown containing electric circuitry 111 (i.e., electric circuitry 111 is contained in the inner volume of the housing of pod structure 101), a second pod structure 102 is shown containing electric circuitry 112, and a third pod structure 108 is shown containing electric circuitry 118. The electric circuitry in any or all pod structures may be communicatively coupled to the electric circuitry in at least one adjacent pod structure by at least one respective communicative pathway (e.g., by at least one electrically conductive pathway and/or by at least one optical pathway). For example, FIG. 1 shows a first set of communicative pathways 121 providing communicative coupling between electric circuitry 118 of pod structure 108 and electric circuitry 111 of pod structure 101, and a second set of communicative pathways 122 providing communicative coupling between electric circuitry 111 of pod structure 101 and electric circuitry 112 of pod structure 102. Communicative coupling between electric circuitries of adjacent pod structures in device 100 may advantageously include systems, articles, and methods for stretchable printed circuit board as described in U.S. Provisional Patent Application Ser. No. 61/872,569 (now U.S. Non-Provisional patent application Ser. No. 14/471,982), systems, articles, and methods for signal routing as described in U.S. Provisional Patent Application Ser. No. 61/866,960 (now U.S. Non-Provisional patent application Ser. No. 14/461,044), and/or systems, articles, and methods for strain mitigation as described in U.S. Provisional Patent Application Ser. No. 61/857,105 (now U.S. Non-Provisional patent application Ser. No. 14/335,668), all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings and/or optical couplings.

Each individual pod structure within a wearable EMG device may perform a particular function, or particular functions. For example, in device 100, each of pod structures 101, 102, 103, 104, 105, 106, and 107 includes a respective EMG sensor 110 (only one called out in FIG. 1 to reduce clutter) that is responsive to (i.e., is operable to detect, sense, or transduce) muscle activity of a user and provides electrical signals in response to the muscle activity. Thus, each of pod structures 101, 102, 103, 104, 105, 106, and 107 may be referred to as a respective "sensor pod." Throughout this specification and the appended claims, the term "sensor pod" is used to denote an individual pod structure that includes at least one sensor responsive to muscle activity of a user. Each EMG sensor may be, for example, a respective capacitive EMG sensor that detects electrical signals generated by muscle activity through capacitive coupling, such as for example the capacitive EMG sensors described in U.S. Provisional Patent Application Ser. No. 61/771,500 (now U.S. Non-Provisional patent application Ser. No. 14/194,252).

Pod structure 108 of device 100 includes a processor 130 that processes the signals provided by the EMG sensors 110 of sensor pods 101, 102, 103, 104, 105, 106, and 107 in response to muscle activity. Pod structure 108 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. A person of skill in the art will appreciate that implementations that employ a digital processor (e.g., a digital microprocessor or microcontroller, a DSP, etc.) may advantageously include a non-transitory processor-readable storage medium or memory communicatively coupled thereto and storing processor-executable instructions that control the operations therefor, whereas implementations that employ an ASIC, FPGA, or analog processor may or may not include a non-transitory processor-readable storage medium.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a sensor and performs at least the function(s) of a sensor pod, and the term processor pod is used to refer to any pod structure that includes a processor and performs at least the function(s) of a processor pod. In device 100, processor pod 108 includes an EMG sensor 110 (not visible in FIG. 1) responsive to (e.g., to sense, measure, transduce or otherwise detect) muscle activity (e.g., electromyographic signals) of a user, so processor pod 108 could be referred to as a sensor pod. However, in exemplary device 100, processor pod 108 is the only pod structure that includes a processor 130, thus processor pod 108 is the only pod structure in exemplary device 100 that can be referred to as a processor pod. In alternative embodiments of device 100, multiple pod structures may include processors, and thus multiple pod structures may serve as processor pods. Similarly, some pod structures may not include sensors, and/or some sensors and/or processors may be laid out in other configurations that do not involve pod structures.

Processor 130 includes and/or is communicatively coupled to a non-transitory processor-readable storage medium or memory 140. As will be described in more detail later, memory 140 may store processor-executable gesture identification instructions 141 that, when executed by processor 130, cause processor 130 to process the EMG signals from EMG sensors 110 and identify a gesture to which the EMG signals correspond. For communicating with a separate electronic device, wearable EMG device 100 includes at least one communication terminal. Throughout this specification and the appended claims, the term "communication terminal" is generally used to refer to any physical structure that provides a telecommunications link through which a data signal may enter and/or leave a device. A communication terminal represents the end (or "terminus") of communicative signal transfer within a device and the beginning of communicative signal transfer to/from an external device (or external devices). As examples, device 100 includes a first communication terminal 151 and a second communication terminal 152. First communication terminal 151 includes a wireless transmitter (i.e., a wireless communication terminal) and second communication terminal 152 includes a tethered connector port 152. Wireless transmitter 151 may include, for example, a Bluetooth® transmitter (or similar) and connector port 152 may include a Universal Serial Bus port, a mini-Universal Serial Bus port, a micro-Universal Serial Bus port, a SMA port, a THUNDERBOLT® port, or the like.

For some applications, device 100 may also include at least one inertial sensor 160 (e.g., an inertial measurement unit, or "IMU," that includes at least one accelerometer and/or at least one gyroscope) responsive to (e.g., to detect, sense, or measure) motion effected by a user and that provides signals in response to the motion. As will be described in more detail later, signals provided by inertial sensor 160 may be combined with signals provided by EMG sensors 110 and processed by processor 130.

Throughout this specification and the appended claims, the term "provide" and variants such as "provided" and "providing" are frequently used in the context of signals. For example, an EMG sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a capacitive EMG sensor may include at least one electrode that capacitively couples to electrical signals from muscle activity. This capacitive coupling induces a change in a charge or electrical potential of the at least one electrode which is then relayed through the sensor circuitry and output, or "provided," by the sensor. Thus, the capacitive EMG sensor may "provide" an electrical signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

As previously described, each of pod structures 101, 102, 103, 104, 105, 106, 107, and 108 may include electric circuitry. FIG. 1 depicts electric circuitry 111 inside the inner volume of sensor pod 101, electric circuitry 112 inside the inner volume of sensor pod 102, and electric circuitry 118 inside the inner volume of processor pod 118. The electric circuitry in any or all of pod structures 101, 102, 103, 104, 105, 106, 107 and 108 (including electric circuitries 121, 122, and 128) may include any or all of: an amplification circuit to amplify electrical signals provided by at least one EMG sensor 110, a filtering circuit to remove unwanted signal frequencies from the signals provided by at least one EMG sensor 110, and/or an analog-to-digital conversion circuit to convert analog signals into digital signals. Device 100 may also include a battery (not shown in FIG. 1) to provide a portable power source for device 100.

Signals that are provided by EMG sensors 110 in device 100 are routed to processor pod 108 for processing by processor 130. To this end, device 100 employs a set of communicative pathways (e.g., 121 and 122) to route the signals that are output by sensor pods 101, 102, 103, 104, 105, 106, and 107 to processor pod 108. Each respective pod structure 101, 102, 103, 104, 105, 106, 107, and 108 in device 100 is communicatively coupled to, over, or through at least one of the two other pod structures between which the respective pod structure is positioned by at least one respective communicative pathway from the set of communicative pathways. Each communicative pathway (e.g., 121 and 122) may be realized in any communicative form, including but not limited to: electrically conductive wires or cables, ribbon cables, fiber-optic cables, optical/photonic waveguides, electrically conductive traces carried by a rigid printed circuit board, electrically conductive traces carried by a flexible printed circuit board, and/or electrically conductive traces carried by a stretchable printed circuit board.

Device 100 from FIG. 1 represents an example of a wearable EMG device that incorporates the teachings of the present systems, articles, and methods, though the teachings of the present systems, articles, and methods are applicable to any wearable EMG device that includes multiple EMG sensors. In most applications, it is advantageous for the wearable EMG device to also include an on-board processor for performing gesture identification as described herein, but a person of skill in the art will appreciate that at least some of the acts involved in gesture identification described herein may be performed by a processor that is separate from the wearable EMG device (e.g., a processor in a computer that receives signals from the wearable EMG device).

The present systems, articles, and methods describe wearable EMG devices (e.g., 100) that do not require a user to undergo an elaborate training procedure in order to provide consistently accurate gesture identification. To this end, the wearable EMG devices (e.g., 100) described herein include a non-transitory processor-readable storage medium (e.g., 140) that stores processor-executable gesture identification instructions (e.g., 141) that, when executed by the processor (e.g., 130) of the wearable EMG device (e.g., 100), cause the processor (e.g., 130) of the wearable EMG device (e.g., 140) to identify a user's gesture(s) using generalized algorithms that are substantially robust against variations in the specific use parameters (such as the form of the user and/or the orientation of the wearable EMG device).

Figure 2:
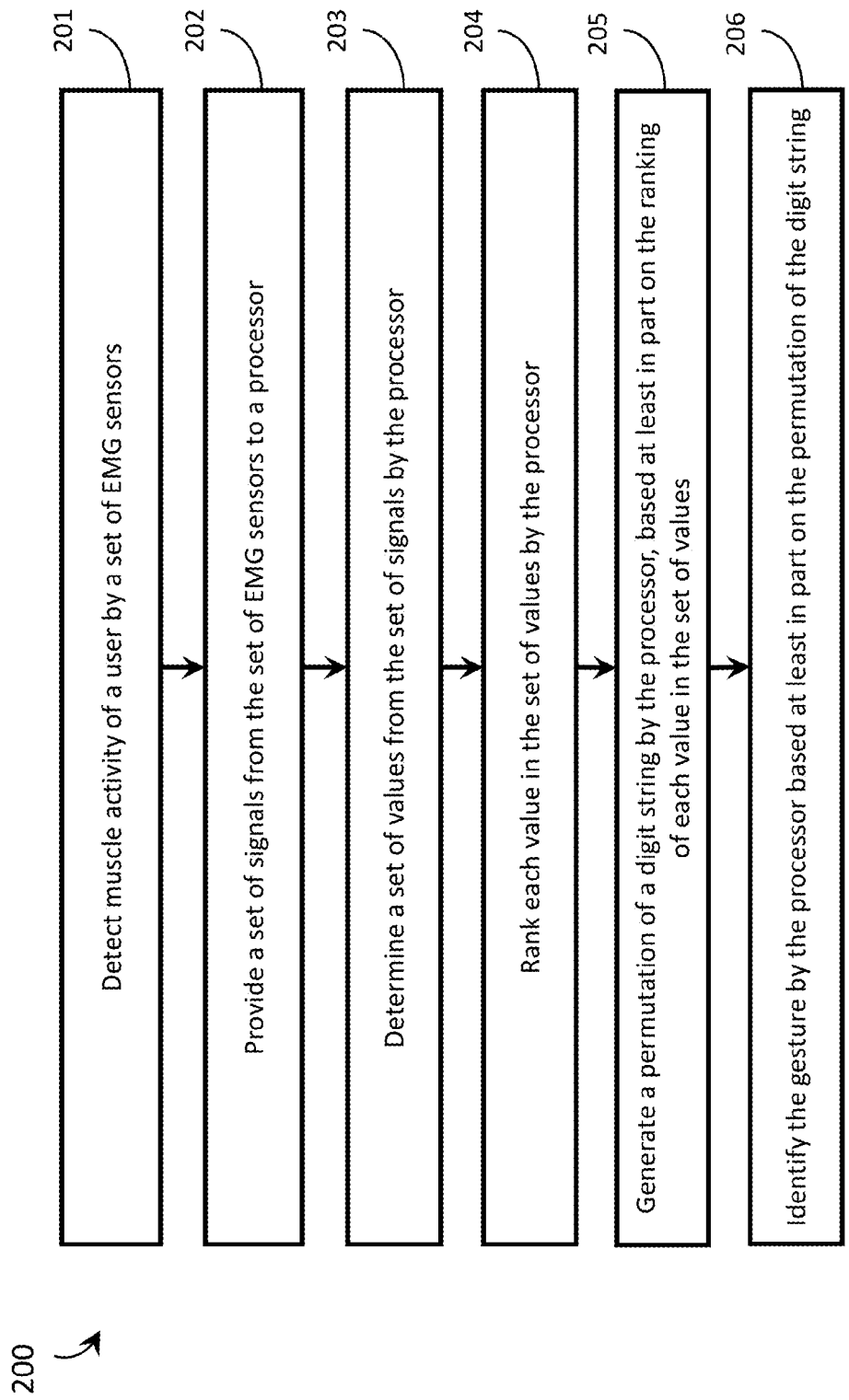
FIG. 2 is a flow-diagram showing a method of operating a wearable EMG device in accordance with the present systems, articles, and methods.

FIG. 2 is a flow-diagram showing a method 200 of operating a wearable EMG device in accordance with the present systems, articles, and methods. The wearable EMG device includes a set of EMG sensors (the set of EMG sensors including multiple EMG sensors, i.e., at least two EMG sensors) and a processor communicatively coupled to the set of EMG sensors. The wearable EMG device may form part of a human-electronics interface in which the wearable EMG device is used to provide gesture-based interaction with an electronic device. Throughout the description of method 200 that follows, reference is made to the elements of system 100 from FIG. 1. A person of skill in the art will appreciate that the elements of system 100 are cited in relation to the acts of method 200 as illustrative examples only and that method 200 may be implemented using other wearable EMG devices. Thus, throughout the description of method 200, references to elements of system 100 from FIG. 1 are placed in parentheses to indicate that such references are non-limiting and used for illustrative purposes only.

Method 200 includes six acts 201, 202, 203, 204, 205, and 206, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 200, the term "user" refers to a person that is wearing the wearable EMG device.

At 201, the set of EMG sensors (110) detects muscle activity of a user of the wearable EMG device (100). The muscle activity corresponds to a physical gesture that is performed by the user. As an example, the wearable EMG device (100) may be worn on an arm of the user and the physical gesture may include a hand gesture such as a finger extension, a pinching gesture, a finger snap, a clenched fist, etc. As previously described, the EMG sensors (110) may include, for example, capacitive EMG sensors that are responsive to (i.e., that detect) electrical signals generated by the user's muscle activity through capacitive coupling to electrical signals generated by the user's muscle activity.

At 202, a set of signals is provided from the set of EMG sensors (110) to the processor (130) of the wearable EMG device (100) in response to the detected muscle activity of act 201. The signals may be, for example, electrical or optical signals routed from the EMG sensors (110) to the processor (130) through electrically conductive or optical communicative pathways (121, 122). Providing a set of signals from the set of EMG sensors (110) to the processor (130) may include providing a respective signal from each respective EMG sensor (110) in the set of EMG sensors to the processor (130). For example, each EMG sensor (110) in the set of EMG sensors may communicatively couple to the processor using a respective signal channel to provide either analog or digital signals to the processor. In the case of providing analog signals from each EMG sensor (110) in the set of EMG sensors to the processor (130), a respective signal channel in the form of a respective physical communicative link (e.g., a respective signal line formed of one or more wires and/or one or more conductive traces, etc.) may communicatively couple from each EMG sensor (110) to the processor (130). In the case of providing digital signals from each EMG sensor (110) in the set of EMG sensors to the processor (130), each EMG sensor (110) may be allocated a respective effective signal channel in the form of, for example, a dedicated bit assignment (i.e., an allocation of bits in specific positions of a bit string), a dedicated signal or time window (i.e., with reference to a clock signal), etc. Further details of systems, articles, and methods for signal routing in wearable EMG devices are described in, for example, U.S. Provisional Patent Application Ser. No. 61/866,960 (now U.S. Non-Provisional patent application Ser. No. 14/461,044).

At 203, a set of values is determined from the set of signals by the processor (130) of the wearable EMG device (100). The set of values may include characteristics, parameters, magnitudes, or generally any "feature" or "features" of the signals in the set of signals. Determining the set of values from the set of signals by the processor (130) may include determining a respective feature or respective features of each signal in the set of signals by the processor (130). The feature(s) that is/are determined for each signal by the processor (130) may include, without limitation: an average value of each signal in the set of signals, a mean value of each signal in the set of signals, a median value of each signal in the set of signals, a mode value of each signal in the set of signals, a maximum value of each signal in the set of signals, a minimum value of each signal in the set of signals, a standard deviation of each signal in the set of signals, and/or a root mean square ("RMS") value of each signal in the set of signals. The set of values determined at 203 may include the same type of feature or signal characteristic (e.g., magnitude, voltage, amperage, state, direction) for each signal in the set of signals or may include different types of features for different signals in the set of signals. The set of values determined at 203 may include the features themselves, or may include relationships between the features, such as respective differences between pairs of features and/or respective correlations between pairs of features. Relationships (e.g., differences and/or correlations) between features may be determined by the processor (130) of the wearable EMG device (100). As will be described in more detail later, each value in the set of values determined at act 203 may be assigned a respective value identifier, or "value ID."

As previously described, the wearable EMG device (100) may include a non-transitory processor-readable storage medium or memory (140) that is communicatively coupled to the processor (130), where the memory (140) stores processor-executable gesture identification instructions (141). When executed by the processor (130), the processor-executable gesture identification instructions may cause the processor to determine a set of values from the set of signals per act 203 of method 200 and/or to assign each value a respective value ID.

At 204, each value in the set of values determined at 203 is ranked by the processor (130) of the wearable EMG device (100). Ranking each value in the set of values may include, for example, assigning a rank number between 1 and N (where N is the number of values in the set of values) to each value in the set of values, where the rank number that is assigned to each value is indicative of the magnitude of that value relative to the magnitudes of the other values in the set of values (e.g., with a rank number of 1 corresponding to the highest ranking and assigned to the value(s) with the largest magnitude and a rank number of N corresponding to the lowest ranking and assigned to the value(s) with the smallest magnitude, or vice versa depending on the implementation). Thus, ranking each value in the set of values effectively assigns a respective rank number to each value ID. In implementations where the wearable EMG device (100) includes a memory (140) storing processor-executable gesture identification instructions (141), the processor (130) may execute the gesture identification instructions (141) to rank each value in the set of values per act 204.

At 205, a permutation of a digit string is generated by the processor, based at least in part on the ranking of each value in the set of values from act 204. The particular permutation of the digit string that is generated may be used to identify the particular gesture performed by the user. In implementations where the wearable EMG device (100) includes a memory (140) that stores processor-executable gesture identification instructions (141), the processor (130) may execute the gesture identification instructions (141) to generate a permutation of a digit string based at least in part on the ranking of each value in the set of values per act 205. In applications for which multiple features are determined at act 203, each type of feature may correspond to a respective set of values at 203 and each respective set of values may be ranked at 204. In this case, respective permutations of multiple digit strings may be generated at 205, with each respective digit string corresponding to a respective feature set (i.e., a respective type of feature).

At 206, the physical gesture that was performed by the user (i.e., the gesture that produced the muscle activity that was detected at 201) is identified or determined by the processor (130) of the wearable EMG device (100) based at least in part on the permutation of the digit string from act 205. In implementations that include a memory (140) that stores processor-executable gesture identification instructions (141), the gesture identification instructions (141) may include a set of gesture identifications. The gesture identifications may include any gesture(s) that the user may perform. For example, if the user wears the wearable EMG device (100) on their arm, then the stored gesture identifications may include, without limitation, a "thumbs up" gesture, a "finger-snap" gesture, a "point/gun" gesture, a "fist" gesture, and so on. In some applications, the wearable EMG device (100) may be designed to output generic gesture identification flags as described in U.S. Provisional Patent Application Ser. No. 61/869,526 (now U.S. Non-Provisional patent application Ser. No. 14/465,194), and in such instances the gesture identifications stored in the memory (140) of the wearable EMG device (100) may include gesture identification flags.

The processor-executable gesture identification instructions (141) may, when executed by the processor (130), cause the processor (130) to effect many-to-one mappings between different permutations of the digit string from act 205 and the stored gesture identifications (e.g., gesture identification flags) described above. In such instances, identifying the gesture based at least in part on the permutation of the digit string as per act 206 may include executing gesture identification instructions (141) stored in the memory (140) by the processor (130) to cause the processor (130) to effect a mapping between the permutation of the digit string and a stored gesture identification.

Throughout this specification and the appended claims, references are made to "effecting a mapping." For example, in the above description, processor-executable gesture identification instructions (141) may, when executed by the processor (130), cause the processor (130) to effect a many-to-one mapping between a permutation of a digit string and a stored gesture identification. Unless the specific context requires otherwise, to "effect a mapping" means to perform an association, an assignment, an algorithm, and/or a series of data processing acts that results in a mapping from an input or inputs (e.g., a permutation of the digit string) to an output or outputs (e.g., a gesture identification). The association, assignment, algorithm, and/or series of data processing acts or steps may, for example, employ a pre-defined mapping such as a stored look-up table, or may, for example, employ an application of rules or actions that produce a mapping, such as a series of "if then" or "if then else" statements (e.g., the "permutation conditions" described later on).

Furthermore, the term "many-to-one mapping" is used herein to refer to a situation in which many different configurations or permutations of inputs may be mapped to the same output or outputs. In other words, different configurations or permutations of inputs may map to the same output such that each configuration or permutation of inputs is not uniquely mapped to a respective output or outputs. Thus, "to effect a many-to-one mapping between different permutations of the digit string and stored gesture identifications" as per the description of act 206 above means that a set of different configurations or permutations of the digit string may all be mapped to the same stored gesture identification such that each unique permutation of the digit string does not uniquely map to a respective unique stored gesture identification.

To clarify some of the details of method 200, an illustrative example of an implementation of method 200 is now provided. This example is provided for illustrative purposes only and does not impose any limitations on the scope of the present systems, articles, and methods.

A user may wear device 100 on one arm. When the user performs a physical gesture with that arm, EMG sensors 110 may detect (per act 201) electrical signals generated by the muscle activity that corresponds to that gesture. Device 100 includes eight EMG sensors 110 that may provide (per act 202) a set of eight signals to processor 130 in response to the detected muscle activity. Each respective signal corresponds to a respective output from a respective EMG sensor 110. An exemplary set of eight signals is shown in FIG. 3.

Figure 3:
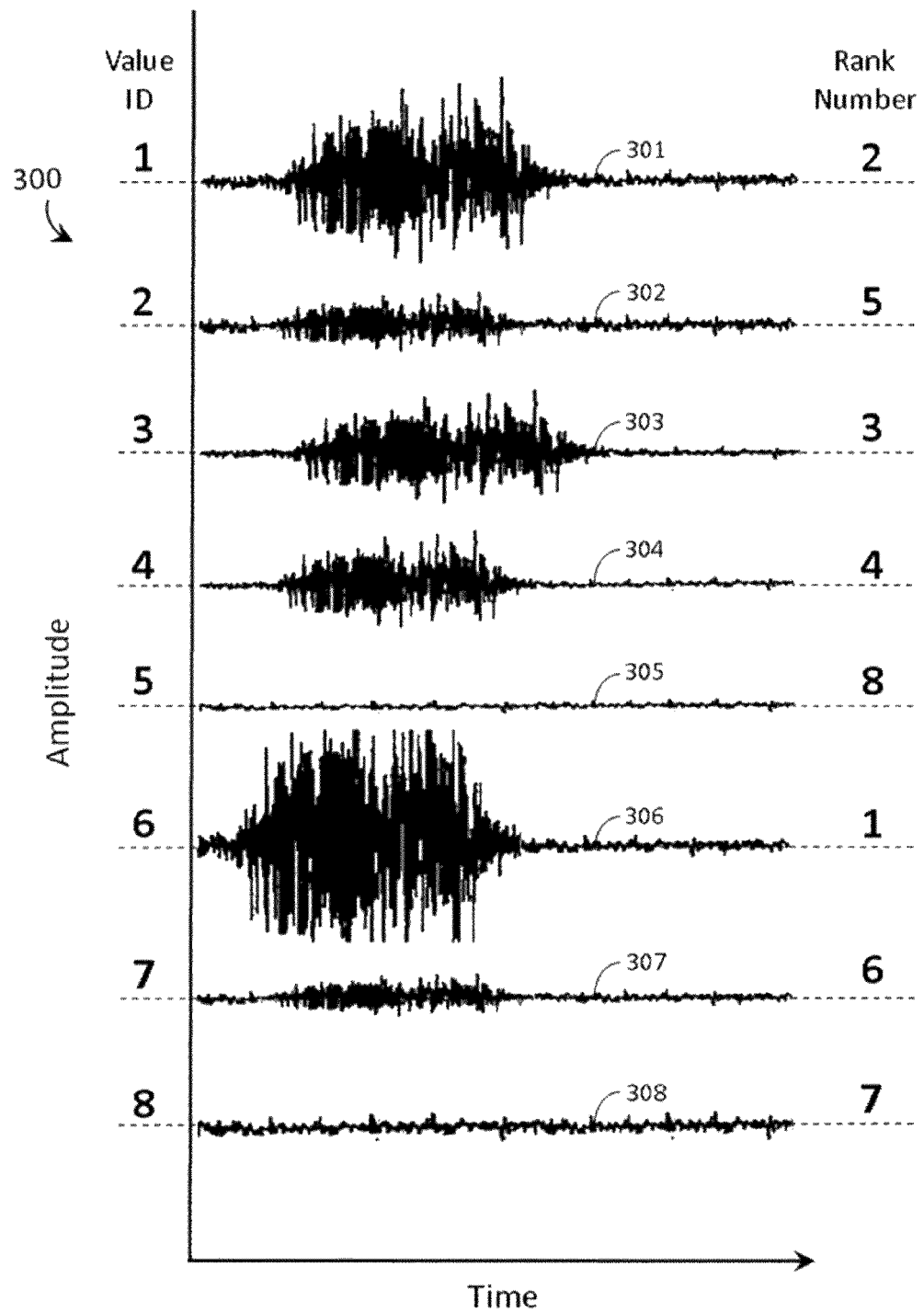
FIG. 3 is a graph showing an exemplary set of eight signals corresponding to respective signal channels output by each of eight EMG sensors in a wearable EMG device in accordance with the present systems, articles, and methods.

FIG. 3 is a graph 300 showing an exemplary set of eight signals 301, 302, 303, 304, 305, 306, 307, and 308 corresponding to respective signal channels output by each of eight EMG sensors 110 in a wearable EMG device 100 in accordance with the present systems, articles, and methods. For example, signals 301, 302, 303, 304, 305, 306, 307, and 308 may respectively correspond to successively adjacent ones of EMG sensors 110 in wearable EMG device 100 with, for example, signal 301 provided by the EMG sensor 110 of sensor pod 101, signal 302 provided by the EMG sensor 110 of sensor pod 102, signal 303 provided by the EMG sensor 110 of sensor pod 103, and so on around the circumference of device 100. Each signal 301, 302, 303, 304, 305, 306, 307, and 308 in the set of eight signals has a respective amplitude that varies over time.

Each EMG sensor 110 of the wearable EMG device 100 is positioned at a different location on the user (e.g., around the circumference of an armband such as in device 100) and is therefore uniquely positioned relative to various muscles of the user. For example, the EMG sensor 110 that provides signal 301 is positioned relatively close to a first muscle of the user and relatively far from a second muscle of the user, while the EMG sensor 110 that provides signal 305 is positioned relatively far from the first muscle of the user and relatively close to the second muscle of the user. During the time period that is depicted in FIG. 3, the user performs a physical gesture that involves substantial activity of some muscles (e.g., substantial activity of the first muscle) and no substantial (or insubstantial) activity of other muscles (e.g., insubstantial activity of the second muscle). Thus, each EMG sensor 110 in the wearable EMG device 100 detects (i.e., responds to) different muscle activity during the gesture and, accordingly, each EMG sensor 110 in the wearable EMG device 100 provides a different signal. As will be described in more detail later, the time period when the user performs the gesture corresponds to the time period when the amplitude of one or more of signals 301, 302, 303 304, 305, 306, 307, and 308 exceeds some threshold.

Continuing with the illustrative example of an implementation of method 200, processor 130 may determine (per act 203) a set of values from the set of eight signals. In this example, the set of values includes a single respective RMS value for each respective signal in the set of eight signals. Thus, in this example, the set of values includes eight RMS values. As discussed in more detail later, some implementations may employ time-separated data windowing of the signals provided by the EMG sensors 110. In such implementations, the set of values may include a respective RMS value for each data window, resulting in a respective set of RMS values for each respective signal in the set of eight signals.

Returning to the example, the RMS value for each respective signal in the set of eight signals depends on the muscle activity detected by the EMG sensor 110 that provides that signal. In the case of signals 301 and 305 from FIG. 3, respectively, processor 130 may determine a first RMS value having a first magnitude from signal 301 and a second RMS value having a second magnitude from signal 305. Processor 130 may execute gesture identification instructions 141 stored in memory 140 in order to determine a respective RMS value for each respective signal (e.g., signals 301 and 305) in the set of eight signals. Processor 130 may assign a respective value ID to each of the RMS values. For example, an RMS value of signal 301 may be assigned a value ID of 1, an RMS value of signal 302 may be assigned a value ID of 2 , and so on, to an RMS value of signal 308, which may be assigned a value ID of 8. Each value ID is indicative of the source or origin of the corresponding value. The assignment of value IDs is initially arbitrary (e.g., signal 301 may arbitrarily be assigned value ID 1, value ID 2, or any value ID), but as described in more detail later on, once value IDs have been assigned it is advantageous to maintain the same consistent assignment. An exemplary assignment of value IDs is shown in FIG. 3.

Processor 130 may rank each RMS value in the set of eight RMS values (per act 204) by assigning a rank number between 1 and 8 to each RMS value in the set of eight RMS values, where the rank number that is assigned to each RMS value is indicative of the magnitude of that RMS value relative to the magnitudes of the other RMS values in the set of eight RMS values. For example, the first magnitude of the first RMS value from signal 301 determined per act 203 is larger than the second magnitude of the second RMS value from signal 302 (RMS values for each signal are not shown in FIG. 3 in order to reduce clutter, but the relative RMS values are reasonably interpretable from the relative amplitudes of the signal channels), and therefore the processor ranks the first RMS value from signal 301 above the second RMS value from signal 302 (per act 204). Taking into account the relative magnitudes of the other six RMS values in the set of eight RMS values, the first RMS value from signal 301 may be assigned a rank number of, for example, 2 indicating that it has the second-largest magnitude of all the RMS values in the set of eight RMS values, and the second RMS value from signal 305 may be assigned a rank number of, for example, 8 indicating that it has the smallest magnitude of all the RMS values in the set of eight RMS values. Rank numbers for each signal are shown in FIG. 3. A person of skill in the art will appreciate that whether the rank number 1 represents the highest or the lowest rank number is arbitrary and may vary in different implementations. Furthermore, method 200 is substantially independent of the specifics of the ranking scheme employed (such as, for example, how "draws" are handled and whether a "1224" scheme or a "1334" scheme is used) and may readily be adapted to accommodate any ranking scheme.

When processor 130 ranks each RMS value in the set of eight RMS values, processor 130 produces an assignment between the value IDs from act 203 and the rank numbers from act 204. An illustration of this assignment for the exemplary data of FIG. 3 is shown in Table 1 below:

TABLE 1

Assignment between value ID and rank number for the exemplary signal data depicted in FIG. 3

| Value ID | Rank Number |
| --- | --- |
| 1 | 2 |
| 2 | 5 |
| 3 | 3 |
| 4 | 4 |
| 5 | 8 |
| 6 | 1 |
| 7 | 6 |
| 8 | 7 |

The assignment in Table 1 above may be represented by, for example, an N-digit string (where N is equal to both the number of value IDs and the number of rank numbers), where the particular permutation of the N-digit string is indicative of the particular gesture performed by the user. For example, in FIG. 3, signal 301 is assigned value ID 1 and a rank number of 2 because signal 301 has the second-largest RMS value, signal 302 is assigned value ID 2 and a rank number of 5 because signal 302 has the fifth-largest RMS value, signal 303 is assigned value ID 3 and a rank number of 3 because signal 303 has the third-largest RMS value, signal 304 is assigned value ID 4 and a rank number of 4 because signal 304 has the fourth-largest RMS value, signal 305 is assigned value ID 5 and a rank number of 8 because signal 305 has the eighth-largest RMS value (i.e., the smallest RMS value), signal 306 is assigned value ID 6 and a rank number of 1 because signal 306 has the largest RMS value, signal 307 is assigned value ID 7 and a rank number of 6 because signal 307 has the sixth-largest RMS value (i.e., the third-smallest RMS value), and signal 308 is assigned value ID 8 and a rank number of 7 because signal 308 has the seventh-largest RMS value (i.e., the second-smallest RMS value). The permutation of the corresponding digit string may take on one of at least two forms: a permutation of rank numbers based on ordering the value IDs or a permutation of value IDs based on ordering the rank numbers.

A permutation of rank numbers based on ordering the value IDs is a string of N digits (where N is the number of value IDs) with each digit corresponding to a respective rank number, and with the N rank numbers arranged in a permutation that is based on ordering the value IDs. For example, the positions of the N rank numbers may be arranged in order from the rank number corresponding to value ID 1 to the rank number corresponding to value ID N (i.e., with the first digit in the digit string corresponding to the rank number for value ID 1 and the $N^{th}$ digit in the digit string corresponding to the rank number for value ID N). In the case of the illustrative example, N is the number of RMS values in the set of RMS values, so N=8, and the value IDs correspond to the eight signal channels providing signals 301, 302, 303, 304, 305, 306, 307, and 308. Thus, a corresponding permutation of rank numbers based on ordering the value IDs for FIG. 3 is:

25348167 where value ID 1 (i.e., the RMS value of signal 301) has a rank number of 2, value ID 2 (i.e., the RMS value of signal 302) has a rank number of 5, and so on, to value ID 8 (i.e., the RMS value of signal 308), which has a rank number of 7.

A permutation of value IDs based on ordering the rank numbers is similar to a permutation of rank numbers based on ordering the value IDs in that it is a string of N digits (where N is the number of value IDs); however, in a permutation of value IDs based on ordering the rank numbers, each digit in the N-digit string corresponds to a respective value ID and the N value IDs are arranged in a permutation that is based on ordering the rank numbers. For example, the positions of the N value IDs may be arranged in order from the value ID corresponding to rank number 1 to the value ID corresponding to rank number N (i.e., with the first digit in the digit string corresponding to a value ID having the highest-ranked rank number (e.g., rank number 1) and the $N^{th}$ digit in the digit string corresponding to a value ID having the lowest-ranked rank number (e.g., rank number N, or the rank number that is closest to rank number N)). In the case of the illustrative example, N is the number of RMS values in the set of RMS values, so N=8. Thus, a corresponding permutation of value IDs based on ordering the rank numbers for FIG. 3 is:

61342785 where rank number 1 (i.e., the rank number corresponding to the largest RMS value, which is signal 306 in the example of FIG. 3) has a value ID of 6, rank number 2 (i.e., the rank number corresponding to the second-largest RMS value, which is signal 301 in the example of FIG. 3) has a value ID of 1, and so on, to rank number 8 (i.e., the rank number corresponding to the smallest RMS value, which is signal 305 in the example of FIG. 3), which has a value ID of 5.

The number of digits in a permutation of a digit string (i.e., in a permutation of rank numbers based on ordering the value IDs and/or in a permutation of value IDs based on ordering the rank numbers) depends on the number of values in the set of values determined at act 203 of method 200 and need not be the same as the number of signals provided by the EMG sensors of a wearable EMG device or the number of EMG sensors in the wearable EMG device. For example, if the set of values determined at act 203 includes the respective difference between each and every pair of signals in the set of signals provided at act 202, then for the example of a wearable EMG device having eight EMG sensors 110, the set of values determined at act 203 may include twenty-eight values and the resulting permutation of the digit string generated at act 205 may include twenty-eight digits. Similarly, in some applications it may be advantageous to generate a permutation of a digit string based on only a subset of the set of values determined at 203. As an example, after each value in the set of values is assigned a corresponding rank number at act 204, only a subset of the values, such as the three highest-ranked values and the two lowest-ranked values, may be used to generate a permutation of a digit string at 205. The permutation conditions used to identify the gesture performed by the user at act 206 would then test for various characteristics of the permutation of the digit string relating only to the three highest-ranked values and the two lowest-ranked values. Thus, some applications may employ digit strings having more or fewer digits than the number of EMG sensors in the wearable EMG device depending on the number of values in the set of values determined at act 203 and/or the permutation conditions used to further process/analyze the permutation of the digit string.

In accordance with the present systems, articles, and methods, each digit in an N-digit string may consistently correspond to the same particular value ID or rank number (depending on whether the digit string is a permutation of rank numbers based on ordering the value IDs or a permutation of value IDs based on ordering the rank numbers) over the course of multiple gestures and/or uses of the wearable EMG device. That is, in the example of a permutation of rank numbers based on ordering the value IDs of FIG. 3, the first digit position of the digit string may consistently correspond to the rank number of signal 301 (provided by the EMG sensor 110 of sensor pod 101 and having value ID 1) for each use of the wearable EMG device 100. Likewise, in the example of a permutation of value IDs based on ordering the rank numbers of FIG. 3, the first digit position of the digit string may consistently correspond to the value ID of the highest-ranking rank number for each use of the wearable EMG device 100. In this way, what changes between different permutations of the digit string is the relative rankings of the different value IDs in response to different gestures performed by the user and not the scheme by which the permutation is ordered.

In this illustrative example, a first gesture performed by a user is processed by EMG sensors 110 and a processor 130 (implementing, e.g., gesture identification instructions 141 stored in a non-transitory computer-readable storage medium 140) of a wearable EMG device 100 to produce a permutation of a digit string. The digit string may represent a permutation of rank numbers based on ordering the value IDs or a permutation of value IDs based on ordering the rank numbers. In the former case, the permutation of the digit string is 25348167, whereas in the latter case, the permutation of the digit string is 61342785. In either case, the permutation of the digit string is analyzed or otherwise processed by the processor 130 of the wearable EMG device 100 to identify the gesture that the user has performed (per act 206). In accordance with the present systems, articles, and methods, the "permutation of the digit string" may be represented in a variety of different forms, including but not limited to a permutation of rank numbers based on ordering the value IDs and/or a permutation of value IDs based on ordering the rank numbers, and the permutation of the digit string may be processed by the processor 130 of the wearable EMG device 100 to identify the gesture that the user has performed regardless of the specific form of the permutation of the digit string. For the remainder of this illustrative example, the permutation of rank numbers based on ordering value IDs for FIG. 3 (i.e., 25348167) is discussed exclusively, though a person of skill in the art will understand that the teachings herein apply to other forms of digit strings, including but not limited to permutations of value IDs based on ordering rank numbers.

A permutation of a digit string may be processed by a processor in many different ways in order to identify the corresponding gesture performed by the user (per act 206). For example, a processor may analyze, compare, and/or characterize various properties of the permutation of the digit string, such as the relative magnitudes/values of each digit and/or the relative digit positions of each rank number/value ID.

In accordance with the present systems, articles, and methods, any given gesture performed by a user of a wearable EMG device may produce a permutation of a digit string having specific properties that may or may not satisfy particular rules and/or conditions (hereafter "permutation conditions"). As an example, a first gesture (e.g., a "point" or "gun" gesture involving an extension of the index finger), referred to herein as "Gesture A," may consistently produce a permutation of rank numbers based on ordering value IDs that satisfies the permutation conditions in Table 2 below:

TABLE 2

An illustrative set of permutation conditions that may be consistently satisfied by a permutation of rank numbers corresponding to an exemplary gesture, Gesture A Gesture A Highest-ranking rank number corresponds to value ID 6 or value ID 7
Highest-ranking rank number is immediately adjacent lowest-ranking rank number
Rank number for value ID 4 is above the rank number for value ID 2
Value ID 3 is in the top 4 rank numbers
. . .

The processor of a wearable EMG device may apply the permutation conditions of Table 2 to the permutation of rank numbers from FIG. 3 (namely, 25348167) and determine that the 25348167 permutation of rank numbers satisfies all of the permutation conditions in Table 2. Because the permutation of rank numbers satisfies all of the permutation conditions in Table 2, the processor identifies the gesture performed by the user as Gesture A in accordance with the present systems, articles, and methods.

The permutation of a digit string that is produced when a user performs a gesture may not be identical each time the same gesture is performed. Discrepancies between different instances of the same gesture may result from variations in many different use parameters, including but not limited to: signal noise, discrepancies in how the gesture is performed, shifts or variations in the orientation and/or position of the wearable EMG device during or between gestures, a different user performing the same gesture, muscle fatigue, a change in environmental or skin conditions, etc. The various embodiments described herein provide systems, articles, and methods for operating a wearable EMG device to identify a gesture (or gestures) performed by a user with improved robustness against such variations in use parameters. Such improved robustness is achieved, at least in part, by determining and applying generalized rules/conditions (such as the exemplary permutation conditions in Table 2) that effect mappings from multiple permutations of a digit string to the same gesture identification.

For example, in the example above it is shown that the 25348167 permutation of rank numbers satisfies all of the permutation conditions in Table 2 and so the processor of the wearable EMG device identifies that Gesture A has been performed. However, there are many permutations of rank numbers that satisfy all of the exemplary permutation conditions in Table 2. A list of a few such permutations includes:

25348167
25346817
25346718
25436718
53428167
. . .

In accordance with the present systems, articles, and methods, multiple permutations (e.g., every permutation) of a digit string that satisfy all of the permutation conditions for a particular gesture may be mapped to that gesture by the processor of a wearable EMG device. In this way, discrepancies in various use parameters when a gesture is performed and detected by a wearable EMG device may be accommodated and the gesture identification process is made robust against such discrepancies.

A person of skill in the art will appreciate that there exists a tradeoff between precision/accuracy and robustness in the gesture identification systems, articles, and methods described herein. The precision/accuracy of gesture identification is increased by increasing the number and/or specificity of the permutation conditions that map to each particular gesture. For example, the permutation condition "The highest-ranking rank number corresponds to value ID 2" is more specific than the permutation condition "The highest-ranking rank number corresponds to a value ID between 1 and 4." Therefore, the permutation condition "The highest-ranking rank number corresponds to value ID 2" may provide more precise/accurate identification of the particular gesture compared to the permutation condition "The highest-ranking rank number corresponds to a value ID between 1 and 4." On the other hand, the permutation condition "The highest-ranking rank number corresponds to a value ID between 1 and 4" is more encompassing than the permutation condition "The highest-ranking rank number corresponds to value ID 2" and may provide improved robustness against variations in use parameters. In accordance with the present systems, articles, and methods, it is advantageous to determine and apply a respective set of permutation conditions for each respective gesture that is simultaneously specific enough to precisely/accurately identify the gesture and general enough to accommodate variations in use parameters when the gesture is performed. Each gesture may be associated with a unique set of permutation conditions, although any individual permutation condition may be included in multiple unique sets of permutation conditions. In other words, the same permutation condition may be used to identify multiple gestures if that permutation condition is combined with a unique combination of other permutation conditions for each respective gesture. Each set of permutation conditions may be structured as a unique set of independent conditions or some/all permutation conditions may be structured as inter-dependent branches of a decision tree.

The set of permutation conditions that corresponds to a particular gesture (e.g., the data of Table 2 for exemplary Gesture A) is an example of a portion of "processor-executable gesture identification instructions that effect a mapping between a permutation of a digit string and a stored gesture identification" in the present systems, articles, and methods. Thus, for each gesture identification (e.g., a "fist" gesture, a "finger snap" gesture, and so on), a corresponding set of permutation conditions may be stored in the non-transitory processor-readable storage medium of a wearable EMG device. Each set of permutation conditions may be stored, for example, as a sequence of "if then" or "if then else" statements that are executed by the processor at, for example, act 206 of method 200. Such may be structured, for example, in a set of independent, parallel sequences or, for example, in one or more overlapping decision trees. Alternatively, all permutations of the digit string that satisfy each unique set of permutation conditions may be identified in advance and stored in a many-to-one look-up table in the non-transitory processor-readable memory of the wearable EMG device. In this case, the processor may identify the gesture performed by a user (per act 206) by locating the resulting permutation of the digit string in the stored many-to-one look-up table and returning the corresponding gesture identification from the many-to-one look-up table. An example of such a many-to-one look-up table is shown in FIG. 4.

Figure 4:
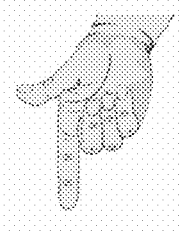
FIG. 4 is a many-to-one look-up table providing an example of a mapping from permutations of a digit string to gesture identifications in accordance with the present systems, articles, and methods.
Figure 4:
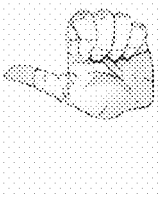

FIG. 4 is a many-to-one look-up table 400 providing an example of a mapping from permutations of a digit string to gesture identifications in accordance with the present systems, articles, and methods. Table 400 is a many-to-one look-up table because multiple permutations of the digit string are mapped to each gesture identification. That is, a respective set of permutations of the digit string is mapped to each individual gesture identification. Each respective set of permutations of the digit string that maps to a particular gesture identification comprises permutations of the digit string that satisfy the permutation conditions corresponding to that particular gesture identification. Table 400 may be, for example, stored in a non-transitory processor-readable storage medium 140 as part of processor-executable gesture identification instructions 141 on-board a wearable EMG device 100.

In accordance with the present systems, articles, and methods, the set of permutation conditions that is associated with each gesture identification may be determined through computer-assisted study and analysis of data (e.g., "training data") from a wearable EMG device for many instances of a gesture performed under many different use parameters. For example, the permutation of rank numbers based on ordering value IDs may be analyzed for many known instances of a "point" or "gun" gesture in order to determine a set of permutation conditions that are generally satisfied by all (or at least, most) known instances of a "point" or "gun" gesture, and thereafter the set of permutation conditions may be applied to identify subsequent instances of the "point" or "gun" gesture. Data (i.e., resulting permutations of digit strings) may be collected for a wide range of users performing specific gestures under a wide range of use parameters. The data may be analyzed to determine respective sets of permutation conditions that are consistently satisfied by most instances (e.g., every instance) of each respective gesture. The respective sets of permutation conditions may be stored in the memory of the wearable EMG device (in a variety of different forms, including but not limited to: independent sequences of data processing acts or steps such as "if then" statements, decision tree-type structures employing overlapping or otherwise dependent sequences of data processing steps such as "if then" statements, a many-to-one look-up table such as table 400 from FIG. 4, and so on) and thereafter used (e.g., executed) by the processor of the wearable EMG device to identify gestures performed by the user based at least in part on a permutation of a digit string (per act 206 of method 200). In this way, the wearable EMG device may rely on previously collected and analyzed data to identify future instances of gestures. The permutation conditions may be established and stored in the wearable EMG device before the end-user ever dons the device. Thus, the wearable EMG devices described herein may identify certain gestures performed by any given user without requiring the user to undergo an elaborate training procedure.

As previously described, in some applications it may be advantageous to combine EMG signals with motion signals sensed, measured, or otherwise detected by, for example, an inertial sensor such as a linear accelerometer or a gyroscope. To this end, any or all of the systems, articles, and methods for wearable EMG devices described herein may include at least one inertial sensor (e.g., IMU 160 of device 100), and method 200 may further include detecting motion corresponding to the gesture performed by the user by the at least one inertial sensor, providing at least one signal from the at least one inertial sensor to the processor in response to the detected motion, and processing the at least one signal from the at least one inertial sensor by the processor. In this case, identifying the gesture by the processor based at least in part on the permutation of the digit string may include identifying the gesture by the processor based at least in part on a result of the processing the at least one signal from the at least one inertial sensor by the processor. The inclusion of motion-based signal data can significantly increase the number of gestures that can be identified by the wearable EMG device 100 and/or increase the distinctiveness of each gesture. For example, a "finger snap" gesture may, in some implementations, be difficult to discern using permutation conditions applied to EMG signal data alone, but accurate identification of a "finger snap" gesture may be significantly augmented by combining the EMG signal data with inertial and/or motion data provided by at least one inertial and/or motion sensor.

While the present systems, articles, and methods achieve robust gesture identification without requiring the user to undergo an elaborate training procedure, the ability of the wearable EMG devices described herein to accurately identify gestures may still rely on specific information about at least some use parameters. For example, in order for a wearable EMG device to perform accurate gesture identification as described herein, the wearable EMG device may require information about the location, position, and/or orientation of its EMG sensors in relation to the muscles of the user. In accordance with the present systems, articles, and methods, all of the necessary information about the location, position, and/or orientation of the EMG sensors may be readily collected by the wearable EMG device by having the user perform a single reference gesture when the wearable EMG device is first donned. Such is a considerable improvement over the elaborate training procedures (requiring the user to perform a series of multiple trials for each of multiple gestures) required by known proposals for wearable EMG devices that perform gesture identification.

A user may be instructed to don a wearable EMG device on, for example, one of their forearms with any orientation and at any location above the wrist and below the elbow that provides a comfortable, snug fit. A feature of exemplary wearable EMG device 100 from FIG. 1 is that the order of the EMG sensors 110 around the perimeter of the device 100 is fixed. That is, each EMG sensor 110 is positioned adjacent and in between the same two other EMG sensors 110 regardless of the position and/or orientation of the device 100. Furthermore, the angular spacing between EMG sensors 110 remains substantially constant as described in U.S. Provisional Patent Application Ser. No. 61/860,063 (now U.S. Non-patent application Ser. No. 14/276,575). Thus, assuming the device 100 is snugly fit on the forearm of the user, in order to determine the position and/or orientation of the EMG sensors 110 on the forearm of the user, only three things need to be determined by the wearable EMG device 100; i) on which arm of the user is the device 100 being worn?, ii) what is the rotational orientation of the device 100?; and iii) what is the front-to-back orientation of the device 100? In accordance with the present systems, articles, and methods, having the user perform a single reference gesture can provide all of the information necessary to answer each of these three questions. An example of answering each of these three questions (i.e., determining position and orientation information of the wearable EMG device) using a single reference gesture is now described. For the example that follows, the device 100 includes an IMU 160 (such as an MPU-9150 Nine-Axis MEMS MotionTracking™ Device from InvenSense) that includes multi-axis accelerometers, gyroscopes, and a compass, and the reference gesture is: begin with the arm (i.e., the arm upon which the device is worn) extended out in front and with the hand forming a loose fist with the thumb on top such that the back or dorsal side of the thumb faces upwards, then open the hand and bend the wrist outwards such that the open palm faces forwards and the extended fingers point outwards approaching ninety degrees to the forearm (i.e., as far past about forty-five degrees that is comfortable for the user). A person of skill in the art will appreciate that the combination of IMU and reference gesture used in this example is not limiting and that many alternative reference gestures and/or motion-detecting devices may similarly be used.

i) On which Arm of the User is Device 100 being Worn?

The reference gesture used in this example causes a small change in the yaw of the wearable EMG device 100. As the user's wrist bends back outwardly, the user's forearm shifts slightly inward. This change in the yaw is determined from signals provided by the IMU 160 and indicates on which arm of the user the device 100 is being worn. For example, a negative change in yaw may indicate that the device 100 is worn on the right arm of the user while a positive change in the yaw may indicate that the device 100 is worn on the left arm of the user. Yaw calculation from accelerometer, gyroscope, and/or compass data can employ any number of techniques including without limitation: sensor fusion algorithms, quaternion-based methods, and the like.

ii) What is the Rotational Orientation of Device 100?

The rotational orientation of device 100 influences which EMG sensors 110 overlie and/or are most proximate to which specific muscle groups in the user's forearm. While device 100 is worn on a forearm of the user, the rotational orientation may be changed by: a) holding device 100 fixed in space with the user's other hand and rotating, twisting, or pronating the forearm upon which the device 100 is worn about the longitudinal axis of the forearm (e.g., from a palm facing up position to a palm facing down position), or b) holding the forearm upon which the device 100 is worn fixed in space and using the other hand to spin the device 100 about the longitudinal axis of the fixed forearm. Returning to the example of FIG. 3, the rotational orientation of device 100 determines which EMG sensor 110 overlies which muscles of the forearm and so determines which EMG sensors provides which signal 301, 302, 303, 304, 305, 306, 307, or 308. In a first rotational orientation, the EMG sensor 110 of sensor pod 101 may provide signal 301, the EMG sensor 110 of sensor pod 102 may provide signal 302, and so on, but in a different rotational orientation, the EMG sensor 110 of sensor pod 106 may provide signal 301, the EMG sensor 110 of sensor pod 107 may provide signal 302, and so on. Neither of these orientations is "more correct" than the other. When the user performs the reference gesture, two adjacent EMG sensors 110 of device 100 detect coincident spikes in muscle activity corresponding to activation of the muscles on the outside or posterior side of the user's arm (e.g., the extensor digitorum, the extensor digiti minimi, and/or the extensor carpi ulnaris). Thus, the rotational orientation of device 100 is determined to be either one of two rotational orientations that place the two spiking EMG sensors 110 proximate the active muscles. The two rotational orientations are distinguished by the front-to-back orientation of device 100 (i.e., the two rotational orientations are front-to-back variants of one another).

iii) What is the Front-to-Back Orientation of Device 100?

The front-to-back orientation of device 100 is established by the side through which the user's hand enters the opening of the closed loop configuration of device 100. For example, in a first front-to-back orientation tethered connector-port 152 of device 100 faces proximally towards the user's elbow and in a second front-to-back orientation tethered connector port 152 faces distally towards the user's hand. When the user performs the reference gesture, the front-to-back orientation of device 100 is determined by the absolute roll of device 100, which is detected by IMU 160. Roll calculation from accelerometer, gyroscope, and/or compass data may employ any of a variety of techniques including without limitation: sensor fusion algorithms, quaternion-based methods, and the like.

As described for the exemplary reference gesture above, a user may calibrate a wearable EMG device in accordance with the present systems, articles, and methods by performing only a single reference gesture. No further training procedures may be required before the device can begin identifying gestures performed by the user.

Any given gesture may produce a specific pattern of muscle activity detected by the EMG sensors, but how the detected muscle activity is distributed among the EMG sensors (i.e., which EMG sensor(s) detect which muscle activity) depends on the position and/or orientation of the EMG sensors on the user's arm. Information about the position and/or orientation of the EMG sensors that is collected by the wearable EMG device when the user performs the reference gesture may be used, for example, to calibrate the permutation conditions that are applied to the digit string during the gesture identification process and/or to calibrate the association(s) between EMG sensor signals and value IDs.

For example, when the digit string represents a permutation of rank numbers based on ordering value IDs, the permutation conditions assume a specific association between value IDs and the position and/or orientation of the EMG sensors on the user's arm. In the example of FIG. 3, value ID 1 corresponds to signal 301 which is provided by the EMG sensor 110 of sensor pod 101 when the user performs Gesture A, value ID 2 corresponds to signal 302 which is provided by the EMG sensor 110 of sensor pod 102 when the user performs Gesture A, and so on. The exemplary permutation conditions by which the processor 130 checks for Gesture A described in Table 2 assume that value ID 1 will be associated with certain muscle activity proximate sensor pod 101 during the performance of Gesture A, value ID 2 will be associated with certain muscle activity proximate sensor pod 102 during the performance of Gesture A, and so on, all based on the position and/or orientation of device 100 on the user's arm. For example, if Gesture A is expected to (based on previously collected and analyzed training data) produce a muscle activity pattern with the highest-ranked rank number corresponding to the EMG sensor 110 that is most proximate the extensor indicis muscle (a muscle that at least partially controls the index finger), then the permutation conditions may reflect which value ID(s) is/are expected to be associated with the EMG sensor 110 that is most proximate the extensor indicis muscle.

In this scenario, FIG. 3 represents muscle activity signals with device 100 positioned and/or oriented such that the EMG sensor 110 of sensor pod 106 is most proximate the extensor indicis muscle during Gesture A, and the permutation condition "Highest-ranking rank number corresponds to value ID 6 or value ID 7" from Table 2 successfully tests for this because value ID 6 is associated with the EMG sensor 110 of sensor pod 106. If the position and/or orientation of device 100 is changed (e.g., the rotational orientation of device 100 is changed), then the EMG sensor 110 of sensor pod 106 may no longer be the most proximate to the extensor indicis muscle and either the permutation condition "Highest-ranking rank number corresponds to value ID 6 or value ID 7" may need to be re-calibrated to reflect which sensor pod (and associated value ID(s)) is most proximate the extensor indicis muscle, or the value IDs may need to be re-calibrated so that value ID 6 is no longer associated with the EMG sensor 110 of sensor pod 106. For example, if the results from the reference gesture indicate that the EMG sensor 110 of either sensor pod 103 or sensor pod 104 is most proximate to the extensor indicis muscle and the same assignment of value IDs to EMG sensors 110 is maintained (such that the signal from the EMG sensor 110 of sensor pod 103 is associated with value ID 3 and the signal from the EMG sensor 110 of sensor pod 104 is associated with value ID 4), then the permutation condition "Highest-ranking rank number corresponds to value ID 6 or value ID 7" for Gesture A may be re-calibrated as: "Highest-ranking rank number corresponds to value ID 3 or value ID 4." Alternatively, the permutation conditions may be maintained (i.e., unchanged) and the assignment of the value IDs may be shifted/modified to accommodate the change in the position and/or orientation of the wearable EMG device 100. In this example, the value IDs may be shifted so that the signal from EMG sensor 110 of sensor pod 103 is associated with value ID 6 and the signal from the EMG sensor 110 of sensor pod 104 is associated with value ID 7.

In accordance with the present systems, articles, and methods, changes in the position and/or orientation of the wearable EMG device may produce changes (e.g., shifts, rotations, etc.) in the resulting permutation of the digit string. An initial reference gesture as described herein is used to determine the "orientation" of the permutation of the digit string. As an example, the permutation of rank numbers discussed for FIG. 3, 25348167, corresponds to a first rotational orientation of device 100. If the rotational orientation of device 100 is varied by, for example, 180 degrees, then the corresponding permutation of rank numbers may also be "rotationally reoriented" by 180 degrees to become 81672534. If the front-to-back orientation of device 100 is also varied, then the corresponding permutation of rank numbers may also be "front-to-back reoriented" to become 43527618. In either case (or in both cases), the permutation conditions and/or the assignment of the value IDs may be recalibrated to reflect the position and/or orientation of device 100 on the user's forearm based on the reference gesture.

A person of skill in the art will appreciate that the position and/or orientation of the wearable EMG device may change during use (e.g., during an extended session of continuous use, such as continuous use for on the order of hours). Accordingly, the various embodiments described herein may include monitoring (and/or a processor-executable instructions stored in a non-transitory processor-readable storage medium that, when executed by the processor of the wearable EMG device, cause the processor to monitor) a quality of match between the signal data provided by the EMG sensors and the gesture identified based on that signal data. If the quality of match shows signs of degradation (or, for example, the wearable EMG device is unable to recognize a gesture performed by the user after one or more attempts) then the wearable EMG device may be configured to prompt the user to perform or repeat the reference gesture. The wearable EMG device may prompt the user to perform or repeat the reference gesture by, for example, illuminating or flashing a corresponding light emitting diode (LED) or other visual indicator, by activating a vibratory motor providing haptic or tactile feedback to the user, and so on. Alternatively, the user may identify degradation in the accuracy of gesture identification and volunteer to perform or repeat the reference gesture. The user may signify an intent to perform or repeat the reference gesture by, for example, toggling a switch or button on the wearable EMG device, or by performing an unambiguously identifiable gesture such as tapping/smacking the wearable EMG device multiple times in quick succession (which is clearly detected by an inertial sensor), etc. The wearable EMG device may be configured to sense when it has been removed by the user (e.g., by sensing an extended period of no inertial sensor activity, or by identifying erratic signals that may be produced by the EMG sensors when they are no longer capacitively coupled to the user's body) and to expect a reference gesture when it is put back on by the user.

In some applications, it can be advantageous to group, parcel, segment, or otherwise divide the signals provided by the EMG sensors into discrete groups, subsets, parcels, segments, chunks, windows, etc. of defined size. For example, some implementations of method 200 may include an optional act, in between acts 202 and 203, of grouping the set of signals (from act 202) into a set of time-separated data windows. In this case, the determining a set of values from the set of signals by the processor of act 203 may include determining a respective value corresponding to each respective data window in the set of time-separated data windows by the processor. For example, a feature (such as an RMS value) of each data window may be determined to provide the set of values of act 203. The time-separated data windows may be end-to-end sequential, or they may overlap, or they may be sampled with overlaps and/or gaps therebetween. The data windows may each be the same size (i.e., spanning the same length of time) or they may be of varying sizes. Likewise, any overlaps and/or gaps between data windows may each be of the same size or they may be of varying sizes.

The various embodiments described herein provide systems, articles, and methods for gesture identification in wearable EMG devices with improved reliability and accuracy of gesture identification for most generic users and/or most generic use conditions for the same user without requiring a user to undergo an elaborate training procedure. A person of skill in the art will appreciate that these improvements over the state of the art may come at the cost of limiting the number of gestures that can be identified. In many applications, a limited number of gestures is sufficient. In such applications, superior accuracy/precision of gesture identification may be achieved by employing gestures that are as distinct/distinguishable from each other as possible. For applications where it is acceptable to further limit the number of available (i.e., identifiable) gestures, the present systems, articles, and methods may be further simplified to provide potentially greater robustness. An example of such a simplification is to apply a binary ranking scheme in act 204 with discretized, binary "on/off" rank numbers so that the resulting permutation of the digit string generated in act 205 has only binary values. Similarly, a ranking scheme employing any number of rank numbers may be employed, where the number of rank numbers may be less than, equal to, or greater than the number of digits (e.g., value IDs) being ranked.

The ranking of act 204 may be based on a threshold check. The processor of the wearable EMG device may compare each value in the set of values to at least one defined threshold (e.g., in the case of RMS values, each RMS value may be compared to a threshold RMS value) and the corresponding digit in the permutation of the digit string may be assigned a first rank number (e.g., "1") if the value exceeds the at least one defined threshold and a second rank number (e.g., "0") if the value does not exceed the at least one defined threshold. Referring to the exemplary signals of FIG. 3, if the threshold(s) is/are defined such that the four highest-ranked value IDs would exceed the threshold(s) and the four lowest-ranked value IDs would not exceed the threshold(s), then the permutation of rank numbers 25348167 generated at act 205 would instead be a simplified binary digit string:

25348167→10110100

In accordance with the present systems, articles, and methods, the set of permutation conditions used for a binary digit string may be substantially reduced and/or simplified compared to the set of permutations conditions used for a non-binary digit string.

While a user is wearing a wearable EMG device such as device 100, the EMG sensors 110 may continually detect (and provide signals in response to) muscle activity even when the user has not performed a deliberate gesture. For example, a wearable EMG device that is configured to detect and identify a thumbs up gesture may continuously detect muscle activity produced by other actions, such as walking, waving, and picking up a cookie. In order to help distinguish the deliberate muscle activity of a gesture from this wealth of background muscle activity, a wearable EMG device may be configured to implement one or more activation thresholds. As an example, acts 201, 202, and 203 of method 200 may be continuously performed by the wearable EMG device whenever the wearable EMG device is powered on (and worn by a user). However, acts 204, 205, and 206 may only be triggered/completed when at least one value in the set of values determined at 203 exceeds a defined threshold. In the exemplary case of the set of values comprising a set of RMS values, an RMS baseline value of each signal channel in its "rest" or "quiescent" state (i.e., when there is no muscle activity detected) may first be determined and then acts 204, 205, and 206 may only be triggered/completed when at least one RMS value in the set of RMS values determined at 203 exceeds the corresponding "rest" or "quiescent" state for that signal channel by a defined percentage, such as by 50%, by 100%, by 150%, etc. In this case, the activation threshold is represented as the percentage (%) above the "rest" or "quiescent" state that an RMS value must reach in order to trigger completion of acts 204, 205, and 206. However, a "rest" or "quiescent" state RMS value may be zero, so a person of skill in the art will appreciate that other threshold schemes may be preferred, including but not limited to: a defined percentage (%) of the mean RMS value for the signal channel, a defined percentage (%) of the maximum RMS value for the signal channel, a fixed minimum RMS value, and so on. In some implementations, the definition of the activation threshold may adjust to accommodate new data (e.g., the mean RMS value for each signal channel may be continuously monitored and updated when applying an activation threshold based on the mean RMS value for each signal channel). In order to limit the number of "false positives" (i.e., the number of instances where acts 204, 205, and 206 are triggered/completed when the user has not performed a deliberate gesture), it may be advantageous to implement multiple activation thresholds that must be exceeded substantially simultaneously (and/or a single activation threshold that must be exceeded by multiple values substantially simultaneously) in order to trigger completion of acts 204, 205, and 206. For example, in some implementations, acts 204, 205, and 206 of method 200 may only be triggered when multiple (e.g., at least two, or at least three, etc.) values in the set of values determined at act 203 exceed at least one activation threshold at substantially the same time.

In accordance with the present systems, articles, and methods, a user's reference gesture may be used to establish at least one activation threshold and/or to normalize EMG signals for that particular user. The reference gesture may be, for example, deliberately selected to involve a Maximum Voluntary Contraction, or MVC, of the user (the exemplary reference gesture described herein is an example of this, where the outward extension of the fingers and bending back of the wrist reaches a maximum point of mobility for most users) and/or the user may be, for example, instructed to perform the reference gesture with particular vigor. In either case, the reference gesture may provide reference values (for example, maximum RMS values) that may be used by the processor to set activation thresholds and/or to normalize signals provided by the EMG sensors for the specific user.

The various embodiments described herein provide systems, articles, and methods for enhancing the automatic gesture recognition performance of a wearable electronic device. A wearable EMG device that detects and process EMG signals is frequently described herein for illustrative purposes, but other forms of controllers (i.e., controllers that are not wearable and/or controllers that do not employ EMG sensors) may similarly be configured to implement the teachings herein. For example, instead of or in addition to employing EMG sensors and/or accelerometers providing gesture control, a controller that operates in accordance with the present systems, articles, and methods may employ, for example, tactile sensors (e.g., buttons, switches, touchpads, or keys) providing manual control, acoustic sensors providing voice-control, optical/photonic sensors providing gesture control, or any other type(s) of user-activated sensors providing any other type(s) of user-activated control. Thus, the teachings of the present systems, articles, and methods may be applied using virtually any type of controller employing sensors (including gesture-based control devices that do not make use of electromyography or EMG sensors), with the acts described herein as being performed by "at least one EMG sensor" and/or "at least one accelerometer" being more generally performed by "at least one sensor."

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a processor-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the processor-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/881,064; U.S. Provisional Patent Application Ser. No. 61/857,105 (now U.S. Non-Provisional patent application Ser. No. 14/335,668); U.S. Provisional Patent Application Ser. No. 61/752,226 (now U.S. Non-Provisional patent application Ser. No. 14/155,107); U.S. Provisional Patent Application Ser. No. 61/768,322 (now U.S. Non-Provisional patent application Ser. No. 14/186,889); U.S. Provisional Patent Application Ser. No. 61/771,500 (now U.S. Non-Provisional patent application Ser. No. 14/194,252); U.S. Provisional Application Ser. No. 61/860,063 (now U.S. Non-Provisional patent application Ser. No. 14/276,575); U.S. Provisional Application Ser. No. 61/866,960 (now U.S. Non-Provisional patent application Ser. No. 14/461,044); U.S. Provisional Patent Application Ser. No. 61/869,526 (now U.S. Non-Provisional patent application Ser. No. 14/465,194); and U.S. Provisional Patent Application Ser. No. 61/872,569 (now U.S. Non-Provisional patent application Ser. No. 14/471,982), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a wearable electromyography ("EMG") device to identify a gesture performed by a user operating the wearable EMG device, wherein the wearable EMG device includes a set of EMG sensors and a processor, the set of EMG sensors communicatively coupled to the processor, and the method comprising:
 detecting muscle activity of the user of the wearable EMG device by the set of EMG sensors, wherein the muscle activity corresponds to the gesture performed by the user;
 in response to detecting muscle activity of the user by the set of EMG sensors, providing a set of signals from the set of EMG sensors to the processor;
 determining a set of values from the set of signals by the processor;
 ranking each value in the set of values by the processor, wherein ranking each value in the set of values by the processor includes assigning a rank number to each value in the set of values by the processor;
 generating a permutation of a digit string based at least in part on the rank number of each value in the set of values by the processor; and
 identifying the gesture by the processor based at least in part on the permutation of the digit string.

2. The method of claim 1 wherein determining a set of values from the set of signals by the processor includes determining a set of features from the set of signals by the processor, wherein each feature in the set of features is selected from the group consisting of: an average value of each signal in the set of signals, a mean value of each signal in the set of signals, a median value of each signal in the set of signals, a mode value of each signal in the set of signals, a maximum value of each signal in the set of signals, a minimum value of each signal in the set of signals, a standard deviation of each signal in the set of signals, and/or a root mean squared ("RMS") value of each signal in the set of signals.

3. The method of claim 2 wherein determining a set of values from the set of signals by the processor further includes determining a respective difference between each feature in the set of features and each of the other features in the set of features by the processor, and wherein ranking each value in the set of values by the processor includes ranking each respective difference between each feature in the set of features and each of the other features in the set of features by the processor.

4. The method of claim 2 wherein determining a set of values from the set of signals by the processor further includes determining a respective correlation between each feature in the set of features and each of the other features in the set of features by the processor, and wherein ranking each value in the set of values by the processor includes ranking each respective correlation between each feature in the set of features and each of the other features in the set of features by the processor.

5. The method of claim 1, further comprising determining an orientation of the wearable EMG device on the user by the wearable EMG device.

6. The method of claim 5 wherein the wearable EMG device includes at least one inertial sensor communicatively coupled to the processor, and wherein determining an orientation of the wearable EMG device on the user by the wearable EMG device comprises:
in response to performance of a reference gesture by the user, detecting muscle activity of the user of the wearable EMG device by the set of EMG sensors, wherein the muscle activity corresponds to the reference gesture performed by the user;
in response to detecting muscle activity of the user by the set of EMG sensors, providing a set of reference EMG signals from the set of EMG sensors to the processor;
in response to performance of the reference gesture by the user, detecting motion of the wearable EMG device by the at least one inertial sensor, wherein the motion corresponds to the reference gesture performed by the user;
in response to detecting motion of the wearable EMG device by the at least one inertial sensor, providing at least one motion signal from the at least one inertial sensor to the processor; and
determining an orientation of the wearable EMG device based on the set of reference EMG signals and the at least one motion signal by the processor.

7. The method of claim 6 wherein the wearable EMG device includes a non-transitory processor-readable storage medium that stores at least one permutation condition, and wherein the method further comprises:
calibrating the at least one permutation condition based at least in part on the orientation of the wearable EMG device.

8. The method of claim 6, further comprising:
prompting the user to perform at least one defined reference gesture.

9. The method of claim 1 wherein the wearable EMG device includes at least one inertial sensor communicatively coupled to the processor, and wherein the method further comprises:
detecting motion of the wearable EMG device by the at least one inertial sensor, wherein the motion corresponds to the gesture performed by the user;
in response to detecting motion of the wearable EMG device, providing at least one signal from the at least one inertial sensor to the processor; and
processing the at least one signal from the at least one inertial sensor by the processor, and wherein identifying the gesture by the processor based at least in part on the permutation of the digit string includes identifying the gesture by the processor based at least in part on a result of the processing the at least one signal from the at least one inertial sensor by the processor.

10. The method of claim 1 wherein the wearable EMG device includes a non-transitory processor-readable storage medium communicatively coupled to the processor, wherein the non-transitory processor-readable storage medium stores processor-executable gesture identification instructions, and wherein identifying the gesture by the processor based at least in part on the permutation of the digit string includes executing the gesture identification instructions by the processor to cause the processor to identify the gesture based at least in part on the permutation of the digit string.

11. The method of claim 10 wherein the non-transitory processor-readable storage medium stores multiple sets of permutation conditions and a set of gesture identifications, each gesture identification being associated with a respective set of permutation conditions, and wherein identifying the gesture by the processor based at least in part on the permutation of the digit string includes applying a set of permutation conditions to the permutation of the digit string and returning the corresponding gesture identification if the permutation of the digit string satisfies the set of permutation conditions by the processor.

12. The method of claim 11 wherein applying a set of permutation conditions to the permutation of the digit string and returning the corresponding gesture identification if the permutation of the digit string satisfies the set of permutation conditions by the processor includes effecting a many-to-one mapping between the multiple sets of permutation conditions and the set of gesture identifications by the processor.

13. The method of claim 10 wherein the non-transitory processor-readable storage medium stores a many-to-one look-up table that maps respective sets of multiple permutations of the digit string to respective gesture identifications, and wherein identifying the gesture by the processor based at least in part on the permutation of the digit string includes locating the permutation of the digit string in the many-to-one look-up table and returning the corresponding gesture identification by the processor.

14. The method of claim 1 wherein providing a set of signals from the set of EMG sensors to the processor includes providing a respective signal from each respective EMG sensor in the set of EMG sensors.

15. The method of claim 14 wherein ranking each value in the set of values by the processor includes ranking the set of values based at least in part on a respective magnitude of each respective value in the set of values by the processor.

16. The method of claim 15 wherein ranking the set of values based at least in part on a respective magnitude of each respective value in the set of values by the processor includes assigning a respective rank number between 1 and N to each respective value in the set of values, wherein N is the number of values in the set of values and the respective rank number that is assigned to each respective value in the set of values is indicative of the magnitude of that value relative to the magnitudes of the other values in the set of values.

17. The method of claim 15 wherein ranking the set of values based at least in part on a respective magnitude of each respective value in the set of values by the processor includes:
comparing each respective value in the set of values to at least one threshold value by the processor; and
assigning a first rank number to each respective value in the set of values that exceeds the at least one threshold value by the processor and assigning a second rank number to each respective value in the set of values that does not exceed the at least one threshold value by the processor.

18. The method of claim 1 wherein determining a set of values from the set of signals by the processor comprises:
grouping the set of signals into a set of time-separated data windows; and
determining a respective value corresponding to each respective data window in the set of time-separated data windows.

19. A wearable electromyography ("EMG") device comprising:
a set of EMG sensors responsive to muscle activity of a user of the wearable EMG device, wherein in response to muscle activity of the user the set of EMG sensors provide a set of signals;
a processor communicatively coupled to the set of EMG sensors;
a non-transitory processor-readable storage medium communicatively coupled to the processor, wherein the non-transitory processor-readable storage medium stores processor-executable gesture identification instructions that, when executed by the processor, cause the processor to:
determine a set of values from the set of signals;
assign a rank number to each value in the set of values;
generate a permutation of a digit string based at least in part on the rank number of each value in the set of values; and
identify a gesture that corresponds to the muscle activity based at least in part on the permutation of the digit string.

20. The wearable EMG device of claim 19, further comprising:
at least one communication terminal communicatively coupled to the processor, the at least one communication terminal to transmit information about the gesture to a receiving device.

21. The wearable EMG device of claim 20 wherein the at least one communication terminal includes at least one of a wireless communication terminal and/or a tethered connector port.

22. The wearable EMG device of claim 19, further comprising:

at least one inertial sensor communicatively coupled to the processor, the at least one inertial sensor responsive to motion effected by the user of the wearable EMG device, wherein in response to motion effected by the user the at least one inertial sensor provides at least one signal to the processor, and wherein the processor-executable gesture identification instructions that, when executed by the processor, cause the processor to identify a gesture that corresponds to the muscle activity based at least in part on the permutation of the digit string include processor-executable gesture identification instructions that, when executed by the processor, cause the processor to identify a gesture that corresponds to both the muscle activity and the motion effected by the user based at least in part on both the permutation of the digit string and a result of processing the at least one signal provided by the at least one inertial sensor by the processor.

23. The wearable EMG device of claim 22 wherein the at least one inertial sensor includes at least one accelerometer and/or at least one gyroscope.

24. The wearable EMG device of claim 19 wherein the processor is selected from the group consisting of: a digital microprocessor, a digital microcontroller, a digital signal processor, a graphics processing unit, an application specific integrated circuit, a programmable gate array, and a programmable logic unit.

25. The wearable EMG device of claim 19, further comprising:
a set of communicative pathways to route signals provided by the set of EMG sensors to the processor, wherein each EMG sensor in the set of EMG sensors is communicatively coupled to the processor by at least one communicative pathway from the set of communicative pathways.

26. The wearable EMG device of claim 25, further comprising:
a set of pod structures that form physically coupled links of the wearable EMG device, wherein each pod structure in the set of pod structures is positioned adjacent and physically coupled to at least one other pod structure in the set of pod structures, and wherein the set of pod structures comprises at least two sensor pods and a processor pod, each of the at least two sensor pods comprising a respective EMG sensor from the set of EMG sensors and the processor pod comprising the processor.

27. The wearable EMG device of 26 wherein each pod structure in the set of pod structures is positioned adjacent and in between two other pod structures in the set of pod structures and physically coupled to the two other pod structures in the set of pod structures, and wherein the set of pod structures forms a perimeter of an annular configuration.

28. The wearable EMG device of claim 26, further comprising:
at least one adaptive coupler, wherein each respective pod structure in the set of pod structures is adaptively physically coupled to at least one adjacent pod structure in the set of pod structures by at least one adaptive coupler.

* * * * *